United States Patent
Livchak et al.

(10) Patent No.: US 10,082,299 B2
(45) Date of Patent: Sep. 25, 2018

(54) EXHAUST FLOW CONTROL SYSTEM AND METHOD

(71) Applicant: OY HALTON GROUP LTD., Helsinki (FI)

(72) Inventors: Andrey V. Livchak, Bowling Green, KY (US); Chester Raczewski, Mississauga (CA); Derek W. Schrock, Bowling Green, KY (US)

(73) Assignee: OY HALTON GROUP LTD., Helsinki (FI)

( * ) Notice: Subject to any disclaimer, the term of this patent is extended or adjusted under 35 U.S.C. 154(b) by 0 days.

(21) Appl. No.: 15/196,693

(22) Filed: Jun. 29, 2016

(65) Prior Publication Data

US 2016/0377298 A1     Dec. 29, 2016

Related U.S. Application Data

(63) Continuation of application No. 13/132,542, filed as application No. PCT/US2009/066660 on Dec. 3, 2009.

(Continued)

(51) Int. Cl.
*F24C 15/20* (2006.01)
*F24F 7/06* (2006.01)
(Continued)

(52) U.S. Cl.
CPC ...... *F24C 15/2021* (2013.01); *F24C 15/2042* (2013.01); *F24F 7/06* (2013.01);
(Continued)

(58) Field of Classification Search
USPC .............................................. 454/61; 126/80
See application file for complete search history.

(56) References Cited

U.S. PATENT DOCUMENTS 2,743,529 A    5/1956   Hayes
2,833,615 A    5/1958   Kollgaard
(Continued)

FOREIGN PATENT DOCUMENTS

AU    1138776 A    9/1977
AU    3400697 A    1/1998
(Continued)

OTHER PUBLICATIONS

Machine translation of JP2007205666A.*
(Continued)

*Primary Examiner* — Avinash Savani
*Assistant Examiner* — Martha Becton
(74) *Attorney, Agent, or Firm* — Potomac Law Group, PLLC; Mark Catan

(57) ABSTRACT

A system and method for controlling the exhaust flow rate in an exhaust ventilation system including an exhaust hood positioned above a cooking appliance. The method can include measuring a temperature of the exhaust air in the vicinity of the cooking appliance, and measuring a radiant temperature of a surface of the cooking appliance, and determining an appliance status based on the measured exhaust air temperature and radiant temperature, and controlling the exhaust flow rate in response to the determined appliance status.

21 Claims, 17 Drawing Sheets

Related U.S. Application Data

(60) Provisional application No. 61/185,168, filed on Jun. 8, 2009, provisional application No. 61/119,716, filed on Dec. 3, 2008.

(51) Int. Cl.
| | |
|---|---|
| F24F 11/30 | (2018.01) |
| F24F 110/10 | (2018.01) |
| F24F 110/12 | (2018.01) |
| F24F 110/40 | (2018.01) |

(52) U.S. Cl.
CPC ........... *F24F 11/30* (2018.01); *F24F 2110/10* (2018.01); *F24F 2110/12* (2018.01); *F24F 2110/40* (2018.01); *Y10T 137/0324* (2015.04)

(56) References Cited

U.S. PATENT DOCUMENTS

| | | |
|---|---|---|
| 2,853,367 A | 9/1958 | Berton et al. |
| 2,862,095 A | 11/1958 | Scofield |
| 2,933,080 A | 4/1960 | Adey |
| 3,045,705 A | 7/1962 | Hausammann |
| 3,254,588 A | 6/1966 | Andrew |
| 3,323,439 A | 6/1967 | Burllynn et al. |
| 3,332,676 A | 7/1967 | Namy |
| 3,381,134 A | 4/1968 | Wolf |
| 3,400,649 A | 9/1968 | Jensen |
| 3,457,850 A | 7/1969 | Sweet et al. |
| 3,513,766 A | 5/1970 | Ahlrich |
| 3,536,457 A | 10/1970 | Henderson |
| 3,612,106 A | 10/1971 | Med et al. |
| 3,690,245 A | 9/1972 | Ferlise et al. |
| 3,752,056 A | 8/1973 | Chamberlin et al. |
| 3,809,480 A | 5/1974 | Somerville et al. |
| 3,825,346 A | 7/1974 | Rizzo |
| 3,829,285 A | 8/1974 | Beck |
| 3,866,055 A | 2/1975 | Roy |
| 3,895,569 A | 7/1975 | Miller |
| 3,943,836 A | 3/1976 | Kuechler |
| 3,952,640 A | 4/1976 | Kuechler |
| 3,978,777 A | 9/1976 | Nett |
| 4,043,319 A | 8/1977 | Jensen |
| 4,047,519 A | 9/1977 | Nett |
| 4,050,368 A | 9/1977 | Eakes |
| 4,056,877 A | 11/1977 | Kuechler |
| 4,085,736 A | 4/1978 | Kuechler |
| 4,105,015 A | 8/1978 | Isom |
| 4,109,641 A | 8/1978 | Hunzicker |
| 4,113,439 A | 9/1978 | Ookubo et al. |
| 4,117,833 A | 10/1978 | Mueller |
| 4,127,106 A | 11/1978 | Jensen |
| 4,134,394 A | 1/1979 | Otenbaker |
| 4,138,220 A | 2/1979 | Davies et al. |
| 4,146,017 A | 3/1979 | Overton |
| 4,147,502 A | 4/1979 | Milton |
| 4,153,044 A | 5/1979 | Nett |
| 4,155,348 A | 5/1979 | Ahlrich |
| 4,160,407 A | 7/1979 | Duym |
| 4,211,154 A | 7/1980 | Eakes |
| 4,213,947 A | 7/1980 | Fremont et al. |
| 4,285,390 A | 8/1981 | Fortune et al. |
| 4,286,572 A | 9/1981 | Searcy et al. |
| 4,287,405 A | 9/1981 | Ohmae et al. |
| 4,346,692 A | 8/1982 | McCauley |
| 4,350,166 A | 9/1982 | Mobarry |
| 4,373,507 A | 2/1983 | Schwartz et al. |
| 4,398,415 A | 8/1983 | Jacocks et al. |
| 4,467,782 A | 8/1984 | Russell |
| 4,475,534 A | 10/1984 | Moriarty |
| 4,483,316 A | 11/1984 | Fritz et al. |
| 4,484,563 A | 11/1984 | Fritz et al. |
| 4,497,242 A | 2/1985 | Moyer |
| 4,556,046 A | 12/1985 | Riffel et al. |
| 4,584,929 A | 4/1986 | Jarmyr et al. |
| 4,586,486 A | 5/1986 | Kaufman |
| 4,617,909 A | 10/1986 | Molitor |
| 4,655,194 A | 4/1987 | Wooden |
| 4,706,553 A | 11/1987 | Sharp et al. |
| 4,773,311 A | 9/1988 | Sharp |
| 4,781,460 A | 11/1988 | Bott |
| 4,788,905 A | 12/1988 | Kohorn |
| 4,793,715 A | 12/1988 | Kasner et al. |
| 4,811,724 A | 3/1989 | Aalto et al. |
| 4,823,015 A | 4/1989 | Galvin et al. |
| 4,831,747 A | 5/1989 | Roos et al. |
| 4,856,419 A | 8/1989 | Imai |
| 4,872,892 A | 10/1989 | Vartiainen et al. |
| 4,903,685 A | 2/1990 | Melink |
| 4,903,894 A | 2/1990 | Pellinen et al. |
| 4,921,509 A | 5/1990 | Maclin |
| 4,934,256 A | 6/1990 | Moss et al. |
| 4,944,283 A | 7/1990 | Tsuchiya |
| 4,944,285 A | 7/1990 | Glassman |
| 5,033,508 A | 7/1991 | Laverty, Jr. |
| 5,042,453 A | 8/1991 | Shellenberger |
| 5,042,456 A | 8/1991 | Cote |
| 5,050,581 A | 9/1991 | Roehl-Hager |
| 5,063,834 A | 11/1991 | Aalto |
| 5,090,303 A | 2/1992 | Ahmed |
| 5,092,227 A | 3/1992 | Ahmed et al. |
| 5,115,728 A | 5/1992 | Ahmed et al. |
| 5,139,009 A | 8/1992 | Walsh |
| 5,146,284 A | 9/1992 | Tabarelli et al. |
| 5,205,783 A | 4/1993 | Dieckert et al. |
| 5,215,075 A | 6/1993 | Caridis et al. |
| 5,215,497 A | 6/1993 | Drees |
| 5,220,910 A | 6/1993 | Aalto et al. |
| 5,240,455 A | 8/1993 | Sharp |
| 5,251,608 A | 10/1993 | Cote |
| 5,268,739 A | 12/1993 | Martinelli et al. |
| 5,311,930 A | 5/1994 | Bruenn |
| 5,312,296 A | 5/1994 | Aalto et al. |
| 5,312,297 A | 5/1994 | Dieckert et al. |
| 5,394,861 A | 3/1995 | Stegmaier |
| 5,395,042 A | 3/1995 | Riley et al. |
| 5,406,073 A | 4/1995 | Sharp et al. |
| 5,413,278 A | 5/1995 | Erikson |
| 5,414,509 A | 5/1995 | Veligdan |
| 5,415,583 A | 5/1995 | Brandt |
| 5,518,446 A | 5/1996 | Jacob |
| 5,522,377 A | 6/1996 | Fritz |
| 5,558,821 A | 9/1996 | Konig |
| 5,580,535 A | 12/1996 | Hoke |
| 5,597,354 A | 1/1997 | Janu et al. |
| 5,622,100 A | 4/1997 | King |
| 5,657,744 A | 8/1997 | Vianen |
| 5,713,346 A | 2/1998 | Kuechler |
| 5,716,268 A | 2/1998 | Strongin et al. |
| 5,718,219 A | 2/1998 | Boudreault |
| 5,720,274 A | 2/1998 | Brunner et al. |
| 5,764,579 A | 6/1998 | McMasters et al. |
| 5,779,538 A | 7/1998 | Jardinier |
| 5,874,292 A | 2/1999 | McMinn |
| 5,882,254 A | 3/1999 | Jacob |
| 5,960,786 A | 10/1999 | Lambertson |
| 5,992,152 A | 11/1999 | Weres et al. |
| 6,044,838 A | 4/2000 | Deng |
| 6,058,929 A | 5/2000 | Fritz |
| 6,089,970 A | 7/2000 | Feustel |
| 6,154,686 A | 11/2000 | Hefferen et al. |
| 6,170,480 B1 * | 1/2001 | Melink ............... F24C 15/2021 126/299 D |
| 6,171,480 B1 | 1/2001 | Lee et al. |
| 6,173,710 B1 | 1/2001 | Gibson et al. |
| 6,179,763 B1 | 1/2001 | Phillips |
| 6,252,689 B1 | 6/2001 | Sharp |
| 6,336,451 B1 | 1/2002 | Koppenwallner et al. |
| 6,347,626 B1 | 2/2002 | Yi |
| 6,351,999 B1 | 3/2002 | Maul et al. |
| 6,401,669 B1 | 6/2002 | Macgowan et al. |
| 6,428,408 B1 | 8/2002 | Bell et al. |
| 6,450,879 B1 | 9/2002 | Suen |
| 6,515,283 B1 | 2/2003 | Castleman et al. |

(56) References Cited

U.S. PATENT DOCUMENTS

| | | |
|---|---|---|
| 6,531,966 B2 | 3/2003 | Krieger |
| 6,549,554 B2 | 4/2003 | Shiojima et al. |
| 6,645,066 B2 | 11/2003 | Gutta et al. |
| 6,669,547 B2 | 12/2003 | Liu |
| 6,692,350 B1 | 2/2004 | Moy |
| 6,739,145 B2 | 5/2004 | Bhatnagar |
| 6,752,144 B1 | 6/2004 | Lee |
| 6,782,294 B2 | 8/2004 | Reich et al. |
| 6,846,236 B2 | 1/2005 | Gregoricka |
| 6,851,421 B2 | 2/2005 | Livchak et al. |
| 6,869,468 B2 | 3/2005 | Gibson |
| 6,878,195 B2 | 4/2005 | Gibson |
| 6,890,252 B2 | 5/2005 | Liu |
| 6,899,095 B2 | 5/2005 | Livchak et al. |
| 6,916,239 B2 | 7/2005 | Siddaramanna et al. |
| 6,920,874 B1 | 7/2005 | Siegel |
| 6,974,380 B2 | 12/2005 | Cui et al. |
| 7,048,199 B2 * | 5/2006 | Melink ............... F24C 15/2021 126/299 D |
| 7,131,549 B2 | 11/2006 | Hook |
| 7,147,168 B1 | 12/2006 | Bagwell et al. |
| 7,258,280 B2 | 8/2007 | Wolfson |
| 7,318,771 B2 | 1/2008 | Huang et al. |
| 7,364,094 B2 | 4/2008 | Bagwell et al. |
| 7,442,119 B2 | 10/2008 | Fluhrer |
| 7,699,051 B2 | 4/2010 | Gagas et al. |
| 7,866,312 B2 | 1/2011 | Erdmann |
| 8,147,302 B2 | 4/2012 | Desrochers et al. |
| 8,312,873 B2 | 11/2012 | Gagas et al. |
| 8,795,040 B2 | 8/2014 | Burdett et al. |
| 2003/0104778 A1 | 6/2003 | Liu |
| 2003/0146082 A1 | 8/2003 | Gibson et al. |
| 2003/0206572 A1 | 11/2003 | Dorwarth et al. |
| 2003/0207662 A1 | 11/2003 | Liu |
| 2003/0210340 A1 | 11/2003 | Romanowich |
| 2004/0011349 A1 | 1/2004 | Livchak et al. |
| 2005/0007578 A1 | 1/2005 | Ziemins et al. |
| 2005/0098640 A1 | 5/2005 | Ichishi et al. |
| 2005/0115557 A1 | 6/2005 | Meredith et al. |
| 2005/0116168 A1 | 6/2005 | Kaushal et al. |
| 2005/0156053 A1 | 7/2005 | Melink |
| 2005/0229922 A1 | 10/2005 | Magner et al. |
| 2005/0279845 A1 | 12/2005 | Bagwell et al. |
| 2006/0009147 A1 | 1/2006 | Huang et al. |
| 2006/0032492 A1 | 2/2006 | Bagwell et al. |
| 2006/0049172 A1 | 3/2006 | Gagas et al. |
| 2006/0060187 A1 | 3/2006 | Luddy et al. |
| 2006/0111816 A1 | 5/2006 | Spalink et al. |
| 2006/0169141 A1 | 8/2006 | Yuen |
| 2006/0177356 A1 | 8/2006 | Miller |
| 2006/0219235 A1 | 10/2006 | Bagwell et al. |
| 2006/0278216 A1 * | 12/2006 | Gagas ................. F24C 15/2028 126/299 D |
| 2007/0001111 A1 | 1/2007 | Rueb et al. |
| 2007/0015449 A1 | 1/2007 | Livchak |
| 2007/0023349 A1 | 2/2007 | Kyllonen et al. |
| 2007/0068509 A1 | 3/2007 | Bagwell et al. |
| 2007/0165353 A1 | 7/2007 | Fleischer |
| 2007/0183154 A1 | 8/2007 | Robson |
| 2007/0184771 A1 | 8/2007 | Fluhrer |
| 2007/0202791 A1 | 8/2007 | Lee et al. |
| 2007/0229293 A1 | 10/2007 | Martino |
| 2007/0272230 A9 | 11/2007 | Meredith et al. |
| 2008/0045132 A1 | 2/2008 | Livchak et al. |
| 2008/0138750 A1 | 6/2008 | Kim |
| 2008/0141996 A1 | 6/2008 | Erdmann |
| 2008/0207109 A1 | 8/2008 | Bagwell et al. |
| 2008/0258063 A1 | 10/2008 | Rabanotti |
| 2008/0274683 A1 | 11/2008 | Burdett et al. |
| 2008/0297808 A1 | 12/2008 | Riza et al. |
| 2008/0302247 A1 | 12/2008 | Magner et al. |
| 2008/0308088 A1 | 12/2008 | Livchak et al. |
| 2009/0032011 A1 | 2/2009 | Livchak et al. |
| 2009/0061752 A1 | 3/2009 | Burdett et al. |
| 2009/0093210 A1 | 4/2009 | Livchak et al. |
| 2009/0129974 A1 | 5/2009 | McEllen |
| 2009/0199844 A1 | 8/2009 | Meredith et al. |
| 2009/0264060 A1 | 10/2009 | Livchak et al. |
| 2011/0269386 A1 | 11/2011 | Burdett et al. |
| 2011/0275301 A1 | 11/2011 | Burdett et al. |
| 2014/0235158 A1 | 8/2014 | Burdett et al. |

FOREIGN PATENT DOCUMENTS

| | | |
|---|---|---|
| AU | 2933601 A | 7/2001 |
| BE | 838829 A | 6/1976 |
| CA | 1054430 A1 | 5/1979 |
| CA | 1069749 A2 | 1/1980 |
| CA | 1081030 A2 | 7/1980 |
| CA | 2536332 A1 | 3/2005 |
| CH | 682512 A | 9/1993 |
| DE | 314477 | 9/1919 |
| DE | 2607301 | 9/1976 |
| DE | 2518750 | 11/1976 |
| DE | 2659736 A1 | 7/1977 |
| DE | 3519189 A1 | 12/1986 |
| DE | 3909125 A1 | 9/1990 |
| DE | 4120175 A1 | 2/1992 |
| DE | 4114329 A1 | 11/1992 |
| DE | 4203916 | 4/1993 |
| DE | 19613513 A1 | 10/1997 |
| EP | 0314085 A1 | 5/1989 |
| EP | 0541863 A1 | 5/1993 |
| EP | 0401583 B1 | 8/1993 |
| EP | 0541862 B1 | 8/1997 |
| EP | 0623398 B1 | 8/1997 |
| EP | 0881935 A1 | 12/1998 |
| EP | 0753706 B1 | 11/2000 |
| EP | 1637810 A1 | 3/2006 |
| EP | 1688151 A1 | 8/2006 |
| EP | 1250556 B1 | 11/2008 |
| EP | 1778418 B2 | 7/2010 |
| FI | 58971 | 1/1981 |
| FR | 2008451 | 1/1970 |
| FR | 2301778 | 9/1976 |
| FR | 2705766 A1 | 12/1994 |
| GB | 1544445 A | 4/1979 |
| GB | 2054143 A | 2/1981 |
| GB | 2132335 A | 7/1984 |
| GB | 2266340 A | 10/1993 |
| HK | 1019417 | 2/2000 |
| JP | 51132645 | 11/1976 |
| JP | 60213753 | 10/1985 |
| JP | 63091442 | 4/1988 |
| JP | 63251741 | 10/1988 |
| JP | 10084039 | 3/1989 |
| JP | 02033552 | 2/1990 |
| JP | 02290450 | 11/1990 |
| JP | 32047937 | 11/1991 |
| JP | 40000140 | 1/1992 |
| JP | 40062347 | 2/1992 |
| JP | 40068242 | 3/1992 |
| JP | 4113143 | 4/1992 |
| JP | 52048645 | 9/1993 |
| JP | 9280619 | 10/1997 |
| JP | 10288371 | 10/1998 |
| JP | 11294810 | 10/1999 |
| JP | H11514734 | 12/1999 |
| JP | 2000081216 | 3/2000 |
| JP | 2002089859 | 3/2002 |
| JP | 2003519771 | 6/2003 |
| JP | 2003269770 | 9/2003 |
| JP | 2007205666 A * | 8/2007 |
| NL | 7601862 | 8/1976 |
| SE | 7602168 | 8/1976 |
| SE | 7904443 | 11/1980 |
| WO | WO8606154 | 10/1986 |
| WO | WO9117803 | 11/1991 |
| WO | WO9208082 | 5/1992 |
| WO | WO9748479 | 12/1997 |
| WO | WO0151857 | 7/2001 |
| WO | WO0183125 | 11/2001 |
| WO | WO0184054 | 11/2001 |
| WO | WO0214728 | 2/2002 |

(56) References Cited

FOREIGN PATENT DOCUMENTS

| WO | WO0214746 | 2/2002 |
|----|-----------|--------|
| WO | WO03056252 | 7/2003 |
| WO | WO2004101101 | 11/2004 |
| WO | WO2005019736 | 3/2005 |
| WO | WO2005114059 | 12/2005 |
| WO | WO2006002190 | 1/2006 |
| WO | WO2006012628 | 2/2006 |
| WO | WO2006074420 | 7/2006 |
| WO | WO2006074425 | 7/2006 |
| WO | WO2007121461 | 10/2007 |
| WO | WO2008065332 | 6/2008 |
| WO | WO2008157418 | 12/2008 |
| WO | WO2009092077 | 7/2009 |
| WO | WO2009129539 | 10/2009 |

OTHER PUBLICATIONS

Examination Report issued for Australian Patent Application No. 2016200838 dated Oct. 20, 2016.
Gidaspow, D. "Multiphase Flow and Fluidization—Continuum and Kinetic Theory Descriptions", Academic Press 1994 (Abstract Only).
International Search Report and Written Opinion dated Jan. 5, 2007, for International Application No. PCT/US05/26378 filed Jul. 25, 2005.
Morsi et al., "An Investigation of Particle Trajectories in Two-Phase Flow Systems", Journal of Fluid Mechanics, 1972, 55: pp. 193-208.
Non-Final Office Action, dated May 28, 2010, in U.S. Appl. No. 12/407,686.
Office Action dated Apr. 4, 2014, in Russian Patent Application 2011122417/03.
Office Action dated Dec. 4, 2013, in Russian Patent Application 2011122417/03.
Office Action dated Feb. 3, 2015, in Japanese Patent Application No. 2011-539713.
Office Action dated Feb. 5, 2015, in Chinese Patent Application No. 200980156063.3.
Office Action dated Jan. 20, 2016 in corresponding European Patent Application No. 09831153.3.
Office Action dated Jul. 5, 2013, in Chinese Patent Application 200980156063.3.
Office Action dated Jun. 10, 2014, in Japanese Patent Application 2011-539713.
Office Action dated Jun. 2, 2013, in Mexican Patent Application MX/a/2011/005770.
Office Action dated Mar. 26, 2014, in Mexican Patent Application MX/a/2011/005770.
Office Action dated Mar. 28, 2014, in Chinese Patent Application 200980156063.3.
Office Action dated Nov. 26, 2015 in corresponding Chinese Patent Application No. 200980156063.3 (includes local counsel's brief summarization in English).
Office Action dated Oct. 15, 2014, in Chinese Patent Application No. 200980156063.3.
Office Action dated Oct. 27, 2015 in corresponding Japanese Patent Application No. 2014-208378 (includes English translation).
Office Action dated Sep. 20, 2013, in Japanese Patent Application 2011-539713.
Patent Examination Report dated Nov. 6, 2014, in Australian Patent Application No. 2009322238.
Prosecution history of U.S. Appl. No. 07/010,277, now U.S. Pat. No. 4,811,724.
Saravelou et al., "Detailed Modeling of a Swirling Coal Flame", Combustion Science and Technology, 1997, 123: pp. 1-22.
Skimm, G.K., Technician's Guide to HVAC, 1995, McGraw-Hill, pp. 322-330.
Supplementary European Search Report dated Mar. 5, 2014, in Application No. EP 11841014.1.
Tennekes et al., "A First Course of Turbulence", Mass. Inst. Tech., 1972 (Abstract Only).
Translation of foreign patent document DE 4203916.
WIPO Machine Translation of JP2007205666.
Office Action for Canadian Patent Application No. 2,745,432 dated Dec. 30, 2015.
Office Action for Japanese Patent Application No. 2014-208378 dated Apr. 5, 2016 (with English language translation).
Examination Report for Indian Patent Application No. 5063/DELNP/2011 dated Mar. 21, 2018.
Office Action for Chinese Patent Application No. 201610134798.8 dated Jun. 27, 2017 (includes English translation).
Office Action for Japanese Patent Application No. 2016-154781 dated Aug. 29, 2017 (includes English translation).

* cited by examiner 1200, cont.

EXHAUST FLOW CONTROL SYSTEM AND METHOD

RELATED APPLICATIONS

The present application is a continuation of U.S. application Ser. No. 13/132,542 filed Aug. 10, 2011 entitled "Exhaust Flow Control System and Method", which is a national stage application of International Application No. PCT/US2009/066660, filed Dec. 3, 2009, which claims the benefit of U.S. Provisional Application No. 61/185,168, entitled "Exhaust System Control", filed Jun. 8, 2009, and U.S. Provisional Application No. 61/119,716, entitled "Exhaust Flow Control System and Method for Cooking Equipment", filed Dec. 3, 2008, all of which are incorporated herein by reference in their entireties.

FIELD

Embodiments of the present invention relate generally to controlling exhaust air flow in a ventilation system. More specifically, embodiments relate to controlling the exhaust air flow rate in an exhaust air ventilation system based on the status of a cooking appliance.

BACKGROUND

Exhaust ventilation systems can be used to remove fumes and air contaminants generated by cooking appliances. These systems are usually equipped with an exhaust hood positioned above the cooking appliance, the hood including an exhaust fan that removes fumes from the area where the cooking appliance is used. Some systems also include manual or automatic dampers that can be opened or closed to change the exhaust air flow in the system.

In order to reduce or eliminate the fumes and other air contaminants generated during cooking it may be helpful to draw some of the air out of the ventilated space. This may increase the energy consumption of the cooking appliance or cooking range. Therefore, it is important to control the exhaust air flow rate to maintain enough air flow to eliminate fumes and other air contaminants, while reducing or minimizing energy loss.

SUMMARY

One or more embodiments include a method for controlling the exhaust flow rate in an exhaust ventilation system including an exhaust hood positioned above a cooking appliance. The method can include measuring a temperature of the exhaust air in the vicinity of the exhaust hood, measuring a radiant temperature of the exhaust air in the vicinity of the cooking appliance, determining an appliance status based on the measured exhaust air temperature and radiant temperature, and controlling the exhaust flow rate in response to the determined appliance status.

One or more embodiments can include controlling the exhaust air flow rate in an exhaust ventilation system where the exhaust air temperature near the vicinity of the exhaust hood is measured using a temperature sensor. Embodiments can further comprise controlling the exhaust air flow rate in an exhaust ventilation system where the radiant temperature in the vicinity of the cooking appliance is measured using an infrared (IR) sensor. Embodiments can further comprise controlling the exhaust air flow rate in an exhaust ventilation system where the appliance status includes a cooking state, an idle state and an off state. In a cooking state it can be determined that there is a fluctuation in the radiant temperature and the mean radiant temperature of the cooking appliance, or that the exhaust temperature is above a minimum exhaust temperature. In an idle state, it can be determined that there is no radiant temperature fluctuation for the duration of the cooking time and the exhaust temperature is less than a predetermined minimum exhaust temperature. In an off state, it can be determined that the mean radiant temperature is less than a predetermined minimum radiant temperature and that the exhaust temperature is less than a predetermined ambient air temperature plus the mean ambient air temperature of the space in the vicinity of the cooking appliance.

Embodiments can further comprise controlling the exhaust air flow rate in an exhaust ventilation system positioned above a cooking appliance where the exhaust air flow is controlled by turning the fan on or off, or by changing the fan speed and the damper position based on the determined appliance status.

Embodiments can further comprise controlling the exhaust air flow rate in an exhaust ventilation system positioned above a cooking appliance where the exhaust flow rate is changed based on a change in the appliance status.

Embodiments can further comprise controlling the exhaust air flow rate in an exhaust ventilation system positioned above a cooking appliance where the exhaust flow rate is changed between a predetermined design exhaust air flow rate, a predetermined idle exhaust air flow rate, and an off exhaust air flow rate, in response to the detected change in appliance status.

Embodiments can further comprise controlling the exhaust air flow rate in an exhaust ventilation system positioned above a cooking appliance where the system is calibrated before controlling the exhaust flow rate. Embodiments can further comprise controlling the exhaust air flow rate in an exhaust ventilation system positioned above a cooking appliance where a difference between the exhaust air temperature and a temperature of ambient space in the vicinity of the ventilation system is measured to determine appliance status.

Embodiments can further comprise controlling the exhaust air flow rate in an exhaust ventilation system positioned above a cooking appliance where the cooking appliance is in the cooking state when there is a fluctuation in the radiant temperature and the radiant temperature is greater than a predetermined minimum radiant temperature, the cooking appliance is in the idle state when there is no fluctuation in the radiant temperature, and the cooking appliance is in the off state when there is no fluctuation in the radiant temperature and the radiant temperature is less than a minimum predetermined radiant temperature.

Embodiments can further comprise controlling the exhaust air flow rate in an exhaust ventilation system positioned above a cooking appliance where the cooking appliance is in the cooking state when the exhaust air temperature is greater than or equal to a maximum predetermined ambient temperature, the cooking appliance is in the idle state when the exhaust air temperature is less than the predetermined maximum ambient temperature, and the cooking appliance is in the off state when the exhaust air temperature is less than a predetermined ambient temperature. Embodiments can further comprise measuring the radiant temperature using an infrared sensor.

Embodiments can further comprise an exhaust ventilation system including an exhaust hood mounted above a cooking appliance with an exhaust fan for removing exhaust air generated by the cooking appliance, at least one sensor for measuring a radiant temperature of the cooking appliance, at least one temperature sensor attached to the exhaust hood for measuring the temperature of the exhaust air, and a control module to determine a status of the cooking appliance based on the measured radiant temperature and exhaust air temperature, and to control an exhaust air flow rate based on said appliance status.

Embodiments can further comprise an infrared sensor for measuring the radiant temperature, a temperature sensor for measuring the exhaust air temperature in the vicinity of the exhaust hood, and a control module which can include a processor to determine the status of the cooking appliance, and to control the exhaust flow rate based on the appliance status.

Embodiments can further comprise a control module that controls the exhaust air flow rate by controlling a speed of an exhaust fan at least one motorized balancing damper attached to the exhaust hood to control a volume of the exhaust air that enters a hood duct.

In various embodiments the control module can further control the exhaust air flow rate by controlling a position of the at least one motorized balancing damper.

Further the control module can determine the appliance status where the appliance status includes a cooking state, an idle state and an off state. Embodiments can further comprise a control module that controls the exhaust flow rate by changing the exhaust flow rate between a design exhaust flow rate (Qdesign), an idle exhaust flow rate (Qidle), and an off exhaust flow rate (0), based on a change in the appliance status.

Embodiments can further comprise a control module that changes the exhaust flow rate to design exhaust flow rate (Qdesign) when the appliance is determined to be in the cooking state, to idle exhaust flow rate (Qidle) when the appliance status is determined to be in the idle state, and to the off exhaust flow rate when the appliance is determined to be in the off state.

Embodiments can further comprise a control module that can further determine a fluctuation in the radiant temperature.

Embodiments can further comprise a control module that can determine that the cooking appliance is in the cooking state when there is a fluctuation in the radiant temperature and the radiant temperature is greater than a predetermined minimum radiant temperature, the cooking appliance is in the idle state when there is no fluctuation in the radiant temperature, and the cooking appliance is in the off state when there is no fluctuation in the radiant temperature and the radiant temperature is less than a minimum predetermined radiant temperature.

Embodiments can further comprise a temperature sensor for measuring an ambient temperature of the air in the vicinity of the ventilation system, and a control module that can further determine a difference between the exhaust air temperature in the vicinity of the exhaust hood and the ambient temperature in the vicinity of the ventilation system.

Embodiments can further comprise a control module that determines that the cooking appliance is in the cooking state when the exhaust air temperature is greater than or equal to a maximum predetermined ambient temperature, the cooking appliance is in the idle state when the exhaust air temperature is less than the predetermined maximum ambient temperature, and the cooking appliance is in the off state when the exhaust air temperature is less than a predetermined ambient temperature. Embodiments can further comprise a control module that controls the exhaust flow rate after the system is calibrated.

Embodiments can comprise a control module for controlling an exhaust flow rate in an exhaust ventilating system comprising an exhaust hood positioned above a cooking appliance, the control module comprising a processor for determining a status of the cooking appliance, and for controlling the exhaust flow rate based on the appliance status.

In various embodiments the control module can further comprise controlling an exhaust flow rate where the appliance status includes one of a cooking state, an idle state and an off state. The control module can further comprise controlling an exhaust flow rate where the exhaust flow rate includes one of a design exhaust flow rate (Qdesign), an idle exhaust flow rate (Qidle), and an off exhaust flow rate. The control module can further comprise a function to change the exhaust flow rate from the design exhaust flow rate to the idle exhaust flow rate and to the off exhaust flow rate. The control module can further comprise controlling an exhaust flow rate where in the cooking state the control module changes the exhaust flow rate to the design air flow rate, in the idle cooking state the control module changes the exhaust flow rate to the idle exhaust flow rate and in the off state the control module changes the exhaust flow to the off exhaust flow rate.

In various embodiments the control module can further comprise controlling an exhaust flow rate where the processor determines the appliance status by measuring an ambient temperature of the exhaust air generated by the cooking appliance, and by measuring a radiant temperature of the cooking appliance.

The control module can further comprise controlling an exhaust flow rate where the processor determines a cooking state when the exhaust air temperature is greater than or equal to a predetermined maximum ambient temperature, an idle state when the exhaust air temperature is less than the predetermined maximum ambient temperature, and an off state when the exhaust air temperature is less than a predetermined ambient temperature.

The control module can further comprise controlling the exhaust flow rate where the processor determines a cooking state when there is a fluctuation in the radiant temperature and the radiant temperature is greater than a predetermined minimum radiant temperature, an idle state when there is no fluctuation in the radiant temperature, and an off state when there is no fluctuation in the radiant temperature and the radiant temperature is less than a predetermined minimum radiant temperature.

The control module can further comprise controlling an exhaust flow rate by controlling a speed of an exhaust fan attached to the exhaust hood for removing the exhaust air generated by the cooking appliance, controlling an exhaust flow rate by controlling a position of at least one balancing damper attached to the exhaust hood, and controlling an exhaust flow rate where the control module further calibrates the system before the controller controls the exhaust flow rate.

DETAILED DESCRIPTION

Figure 1:
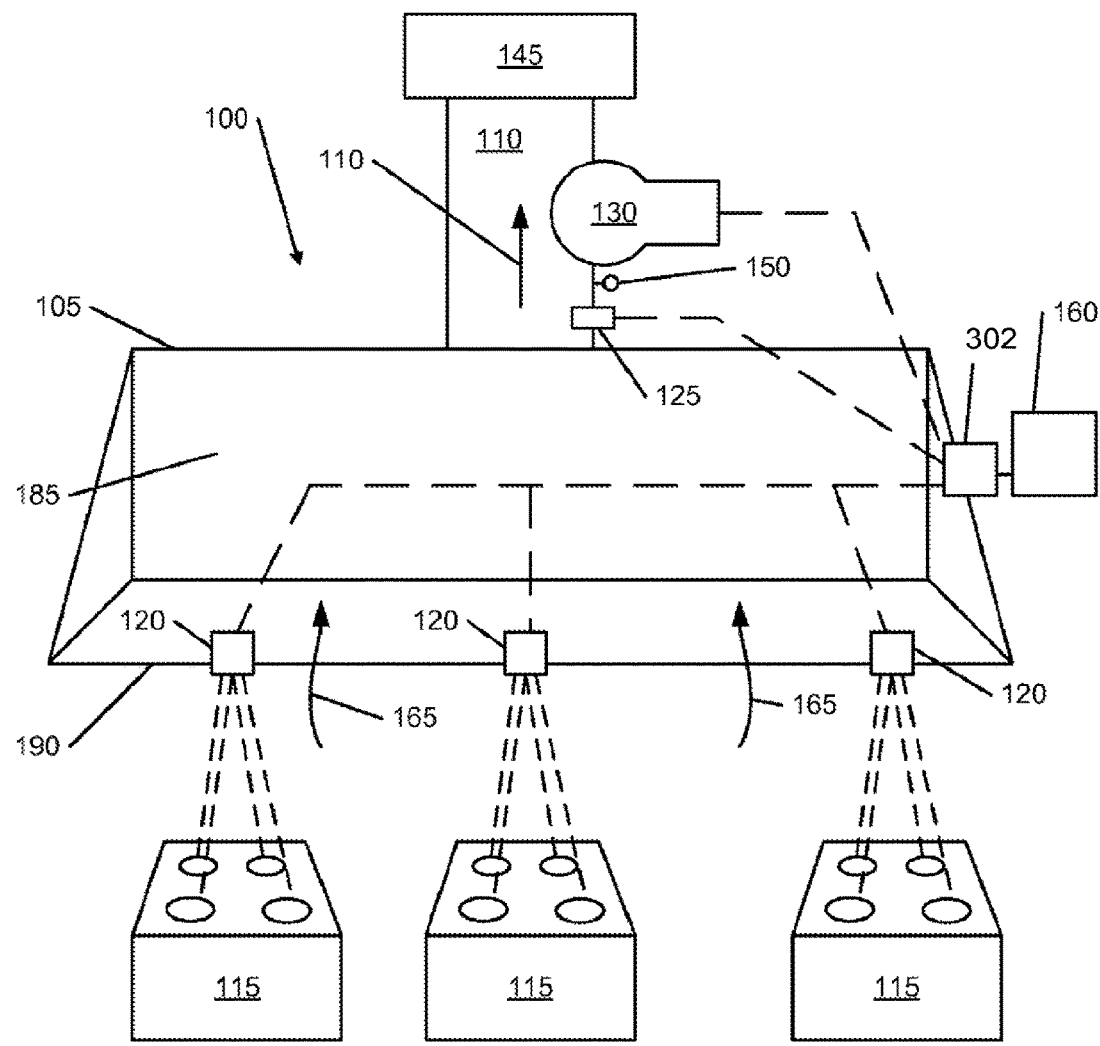
FIG. 1 is a perspective view diagrammatically illustrating an exhaust ventilating system positioned above a cooking appliance and having an exhaust airflow control system according to various embodiments.

Referring to FIG. 1, there is shown an exemplary exhaust ventilation system 100 including an exhaust hood 105 positioned above a plurality of cooking appliances 115 and provided in communication with an exhaust assembly 145 through an exhaust duct 110. A bottom opening of the exhaust hood 105 may be generally rectangular but can have any other desired shape. Walls of the hood 105 define an interior volume 185, which communicates with a downwardly facing bottom opening 190 at an end of the hood 105 that is positioned over the cooking appliances 115. The interior volume 185 can also communicate with the exhaust assembly 145 through the exhaust duct 110. The exhaust duct 110 can extend upwardly toward the outside venting environment through the exhaust assembly 145.

Exhaust assembly 145 can include a motorized exhaust fan 130, by which the exhaust air generated by the cooking appliances 115 is drawn into the exhaust duct 110 and for expelling into the outside venting environment. When the motor of the exhaust fan 130 is running, an exhaust air flow path 165 is established between the cooking appliances 115 and the outside venting environment. As the air is pulled away from the cook top area, fumes, air pollutants and other air particles are exhausted into the outside venting environment through the exhaust duct 110 and exhaust assembly 145.

The exhaust ventilating system 100 can further include a control module 302 which preferably includes a programmable processor 304 that is operably coupled to, and receives data from, a plurality of sensors and is configured to control the speed of the motorized exhaust fan 130, which in turn regulates the exhaust air flow rate in the system 100. The control module 302 controls the exhaust fan 130 speed based on the output of a temperature sensor 125 positioned on or in the interior of the exhaust duct 110, and the output of infrared (IR) radiant temperature sensors 120, each positioned to face the surface of the cooking appliances 115. In at least one embodiment, three IR sensors 120 can be provided, each one positioned above a respective cooking appliance 115, so that each IR sensor 312 faces a respective cooking surface 115. However, any number and type of IR sensors 120 and any number of cooking appliances 115 may be used, as long as the radiant temperature of each cooking surface is detected. The control module 302 communicates with sensors 125 and 120 and identifies the cooking appliance status based on the sensor readings. The status of the cooking appliances 115 is determined based on the exhaust air temperature and the radiant temperature sensed using these multiple detectors.

The control module 302 communicates with the motorized exhaust fan 130 which includes a speed control module such as a variable frequency drive (VFD) to control the speed of the motor, as well as one or more motorized balancing dampers (BD) 150 positioned near the exhaust duct 110. The control module 302 can determine a cooking appliance status (AS) based on the exhaust temperature sensor 125 and the IR radiant temperature sensor 120 outputs, and change the exhaust fan 130 speed as well as the position of the motorized balancing dampers 150 in response to the determined cooking appliance status (AS). For example, the cooking appliance 115 can have a cooking state (AS=1), an idle state (AS=2) or an OFF state (AS=0). The status of a cooking appliance 115 can be determined based on temperature detected by the exhaust temperature sensors 125 and the IR sensors 120. According to various embodiments, the method by which the appliance status (AS) is determined is shown in FIGS. 4-12 and discussed in detail below. Based on the determined appliance status (AS), the control module 302 selects a fan speed and/or a balancing damper position in the system so that the exhaust flow rate corresponds to a pre-determined exhaust flow rate associated with a particular appliance status (AS).

Figure 2:
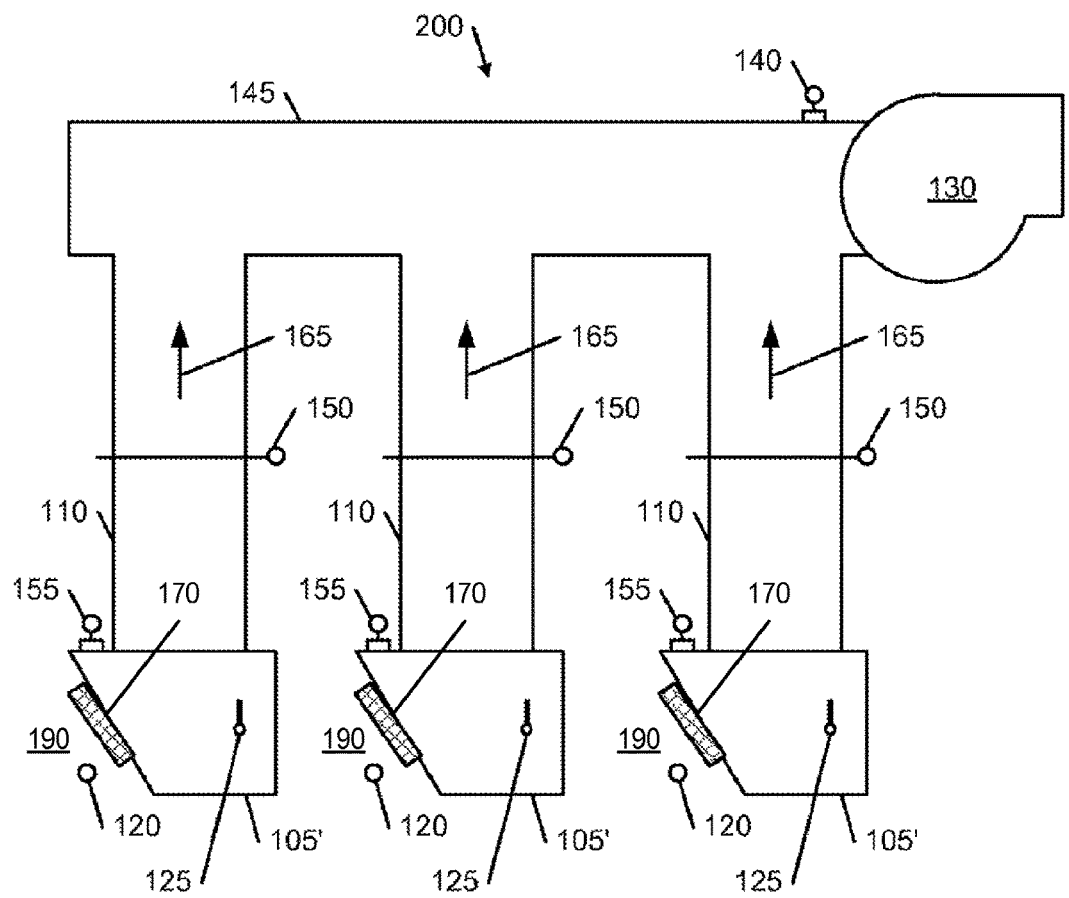
FIG. 2 is a perspective view diagrammatically illustrating an exhaust ventilating system having motorized dampers.

Referring to FIG. 2, a second embodiment of an exhaust ventilation system 200 is shown having a plurality of exhaust hoods 105' which can be positioned above one or more cooking appliances 115 (depending on the size of the cooking equipment). The system 200 can include at least one exhaust temperature sensor 125 for each of the respective hoods 105', as well as at least one pressure transducer 155 connected to each of the respective hood tab ports (TAB). Each of the exhaust hood ducts 110 can include a motorized balancing damper 150. The balancing dampers 150 can be positioned at the respective hood ducts 110 and may include an actuator that provides damper position feedback. The system 200 can also include at least one IR sensor 120 (such as IR sensor(s) 312 shown in FIG. 3) positioned so that it detects the radiant temperature of respective cooking surfaces. An exhaust fan 130 can be connected to the exhaust assembly 145 to allow exhaust air to be moved away from the cook-tops into the surrounding outside venting environment. An additional pressure transducer 140 can be included to measure the static pressure in the main exhaust duct that is part of the exhaust assembly 145, as well as a plurality of grease removing filters 170 at the exhaust hood 105 bottom opening 190 to remove grease and fume particles from entering the hood ducts 110.

Figure 3:
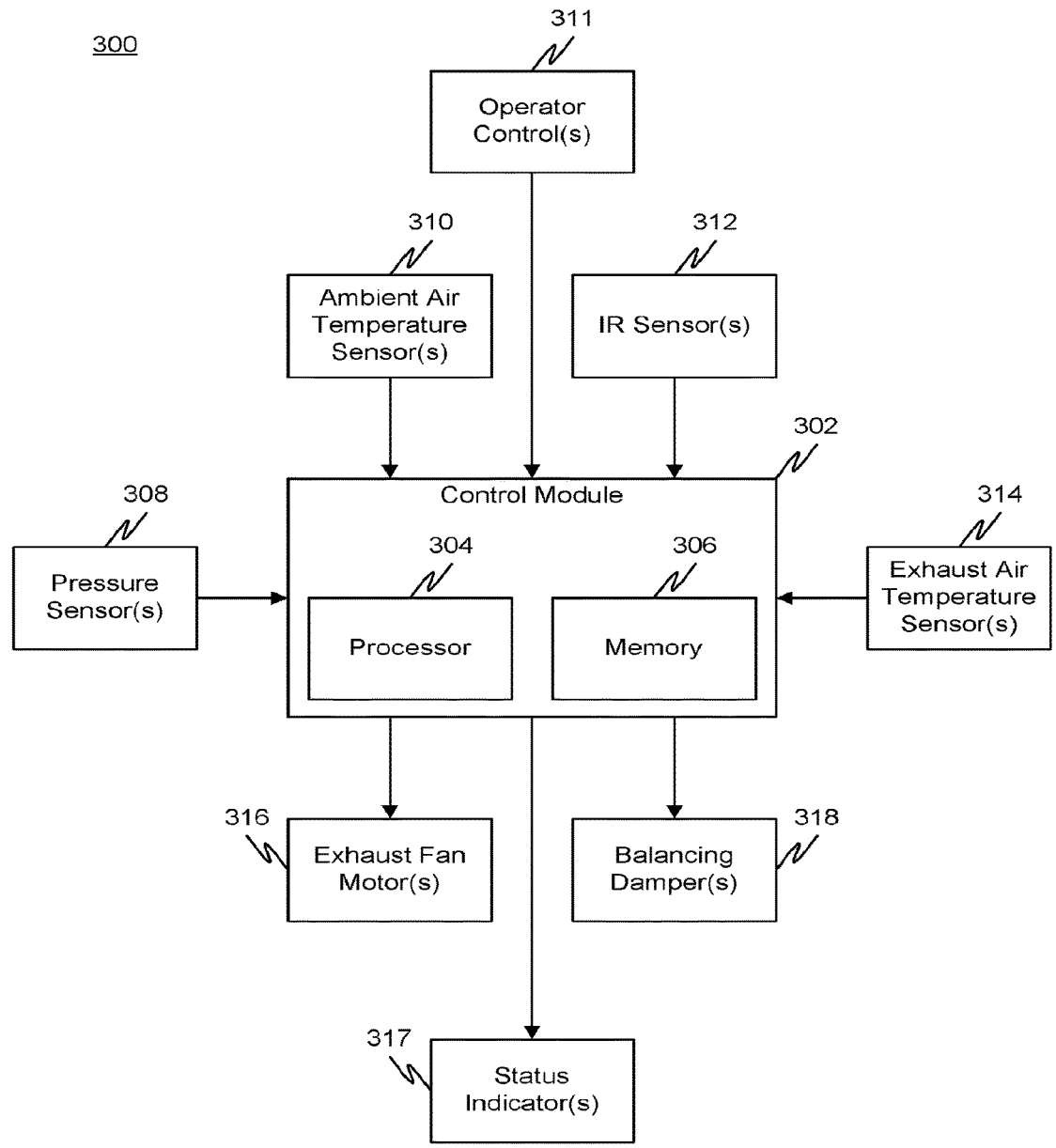
FIG. 3 is a block diagram of an exemplary exhaust air flow rate control system in accordance with the disclosure.

FIG. 3 shows a schematic block diagram of an exhaust flow rate control system 300 that can be used in connection with any of the above shown systems (e.g., 100 and 200). As shown in FIG. 3, the exhaust flow control system 300 includes a control module 302. The control module 302 includes a processor 304 and a memory 306. The control module 302 is coupled to and receives inputs from a plurality of sensors and devices, including an IR sensor 312, which can be positioned on the exhaust hood canopy 105 so that the IR sensor 312 faces the surface of the cooking appliance 115 and detects the radiant temperature emanating from the cooking surface, an exhaust air temperature sensor 314 installed close to a hood duct 110 to detect the temperature of the exhaust air that is sucked into the hood duct 110, an ambient air temperature sensor 310 positioned near the ventilation system (100, 200) to detect the temperature of the air surrounding the cooking appliance 115, a pressure sensor 308, which can be positioned near a hood tab port (TAB) to detect the pressure built-up in the hood duct 110, and optional operator controls 311. Inputs from the sensors 308-314 and operator controls 311 are transferred to the control module 302, which then processes the input signals and determines the appliance status (AS) or state. The control module processor 304 can control the speed of the exhaust fan motor(s) 316 and/or the position of the motorized balancing dampers 318 (BD) based on the appliance state. Each cooking state is associated with a particular exhaust flow rate (Q), as discussed below. Once the control module 302 determines the state the is in, it can then adjust the speed of the exhaust fan 316 speed and the position of the balancing dampers 318 to achieve a pre-determined air flow rate associated with each appliance status.

In various embodiments, the sensors 308-314 can be operably coupled to the processor 304 using a conductive wire. The sensor outputs can be provided in the form of an analog signal (e.g. voltage, current, or the like). Alternatively, the sensors can be coupled to the processor 304 via a digital bus, in which case the sensor outputs can comprise one or more words of digital information. The number and positions of exhaust temperature sensors 314 and radiant temperature sensors (IR sensors) 312 can be varied depending on how many cooking appliances and associated hoods, hood collars and hood ducts are present in the system, as well as other variables such as the hood length. The number and positioning of ambient air temperature sensors 310 can also be varied as long as the temperature of the ambient air around the ventilation system is detected. The number and positioning of the pressure sensors 308 can also be varied as long as they are installed in the hood duct in close proximity to the exhaust fan 130 to measure the static pressure (Pst) in the main exhaust duct. All sensors are exemplary and therefore any known type of sensor may be used to fulfill the desired function. In general, the control module 302 can be coupled to sensors 308-314 and the motors 316 and dampers 318 by any suitable wired or wireless link.

In various embodiments, multiple control modules 302 can be provided. The type and number of control modules 302 and their location in the system may also vary depending on the complexity and scale of the system as to the number of above enumerated sensors and their locations within a system.

As mentioned above, the control module 302 preferably contains a processor 304 and a memory 306, which can be configured to perform the control functions described herein. In various embodiments the memory 306 can store a list of appropriate input variables, process variables, process control set points as well as calibration set points for each hood. These stored variables can be used by the processor 304 during the different stages of the check, calibration, and start-up functions, as well as during operation of the system.

In various embodiments, the processor 304 can execute a sequence of programmed instructions stored on a computer readable medium (e.g., electronic memory, optical or magnetic storage, or the like). The instructions, when executed by the processor 304, cause the processor 304 to perform the functions described herein. The instructions may be stored in the memory 306, or they may be embodied in another processor readable medium, or a combination thereof. The processor 304 can be implemented using a microcontroller, computer, an Application Specific Integrated Circuit (ASIC), or discrete logic components, or a combination thereof.

In various embodiment, the processor 304 can also be coupled to a status indicator or display device 317, such as, for example, a Liquid Crystal Display (LCD), for output of alarms and error codes and other messages to a user. The indicator 317 can also include an audible indicator such as a buzzer, bell, alarm, or the like.

Figure 4:
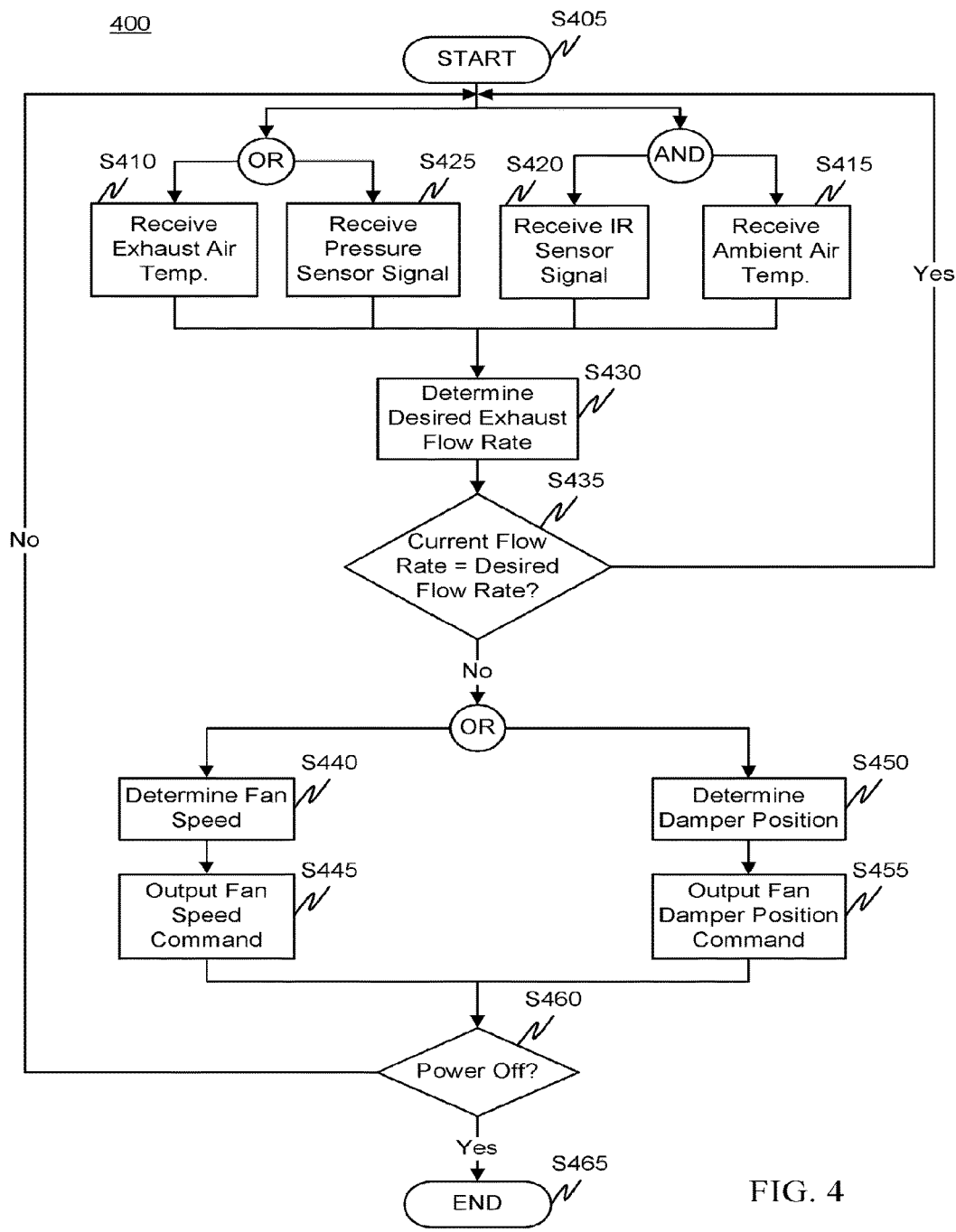
FIG. 4 is a flow chart illustrating an exemplary exhaust flow rate control method according to various embodiments.

With respect to FIG. 4, there is shown an exemplary method 400 according to various embodiments. The method 400 begins at S405 and continues to S410 or S425 to receive an exhaust air temperature input or a pressure sensor input and to S415 and S420 to receive an ambient air temperature input and an infrared sensor input. Control continues to S430.

At S430, the current exhaust flow rate (Q) is determined Control continues to S435.

At S435, the current exhaust flow rate is compared to the desired exhaust flow rate. If the determined exhaust flow rate at S430 is the desired exhaust flow rate, control restarts. If the determined exhaust flow rate at S430 is not the desired exhaust flow rate, control proceeds to S440 or S450, based on system configuration (e.g., if motorized dampers are present then control proceed to S450, but if no motorized dampers are present then control proceeds to S440).

Based on configuration, the damper(s) position is determined at S450 or the exhaust fan speed is determined at S440. Based on the different options at S440 and S450, the control proceeds to output a damper position command to the damper(s) at S455 or an output speed command to the exhaust fan at S445. The control can proceed then to determine whether the power of the cooking appliance is off at S460, in which case the method 400 ends at S465, or to start the method again if power is determined to still be on at S460.

Before operation, the system 100, 200 can be checked and calibrated by the control module 302 during the starting process, in order to balance each hood to a preset design and idle exhaust flow rate, to clean and recalibrate the sensors, if necessary, and to evaluate each component in the system for possible malfunction or breakdown. The appropriate alarm signals can be displayed on an LCD display in case there is a malfunction in the system, to inform an operator of the malfunction and, optionally, how to recover from the malfunction.

For example, the exemplary embodiment where the system 100 includes single or multiple hoods connected to a single exhaust fan 130, and without motorized balancing dampers (BD) 150, the control module 302 may include a list of the following examples of variables for each hood, as set forth below, in Tables 1-4:

TABLE 1

Hood set point list (which can be preset)

| Parameter name & units | Default value | Notes |
|---|---|---|
| Qdesign, cfm | | |
| Kf | | |
| Kidle | 0.2 | |
| kFilterMissing | 1.1 | |
| kFilterClogged | 1.1 | |
| Patm, "Hg | 29.92 | Calculated for jobs with elevation above 1000 ft. |
| dTcook, ° F. | 10 | |
| dTspace, ° F. | 10 | |
| Tmax, ° F. | 110 | |
| Tfire, ° F. | 400 | Set to be at least 10° F. below fuse ling temperature |
| TimeCook, s | 420 | |
| TimeOR, s | 60 | |
| dTIRmax, ° F. | 5 | |

TABLE 2

List of process control set points

| Parameter name & units | Default value | Notes |
|---|---|---|
| IR1_Derivative_Max_SP | −1° C./sec | Derivative for Flare-up Set Point |
| IR1_Derivative_Min_SP | 300 sec | Derivative for IR Index Drop Set Point |
| IR1_Drop_SP1 | 1° C. | IR Index Drop Set Point |
| IR1_Filter_Time | 10 sec | IR Signal Filter Time Set Point |
| IR1_Jump_SP | 1° C. | IR Signal Jump Set Point (for flare-up) |
| IR1_Start_SP | 30° C. | IR Signal Start Cooking Equipment Set Point |
| IR2_Cooking_Timer1 | 420 sec. | Cooking Timer Set Point for IR1 Field of View |
| IR2_Derivative_Max_SP | 1° C./sec | Derivative for Flare-up Set Point |
| IR2_Derivative_Min_SP | −1° C./sec | Derivative for IR Index Drop Set Point |
| IR2_Drop_SP1 | 1° C. | IR Index Drop Set Point |
| IR2_Filter_Time | 10 sec | IR Signal Filter Time Set Point |
| IR2_Jump_SP | 1° C. | IR Signal Jump Set Point (for flare-up) |
| PID_Cal_K | 0.5%/CFM | PID Proportional Coefficient in Calibration Mode |
| PID_Cal_T | 100 sec | PID Integral Coefficient in Calibration Mode |
| PID_K | 0.5%/CFM | PID Proportional Coefficient in Cooking Mode |
| PID_T | 100 sec | PID Integral Coefficient in Cooking Mode |

TABLE 3

List of set points acquired during calibration for each hood

| Parameter name & units | Notes |
|---|---|
| VFDdesign, 0 to 1 | |
| VFDidle, 0 to 1 | |
| dTIRcal$_i$, ° F. | Recorded for each IR sensor in the hood |
| Qdesign1, cfm | Recorded only for multiple hoods connected to a single fan |

TABLE 4

List of process variables

| Parameter name & units | Notes |
|---|---|
| Q$_i$, cfm | For each hood |
| Qtot, cfm | See Equation A1.1 for calculating airflow |
| kAirflowDesign | See Equation A1.1 for calculating airflow |
| IRT$_{i,n}$, ° F. | For each sensor in the hood |
| Tex$_i$, ° F. | For each hood |
| Tspace, ° F. | One for the whole space |

For example, the exemplary embodiment where the system 100 includes multiple hoods connected to a single exhaust fan 130, where hoods are equipped with motorized balancing dampers (BD) 150, the control module 302 may include a list of the following example variables for each hood, as set forth below in Tables 5-8:

List of Input Variables for Each Hood

TABLE 5

Hood set point list (may be preset)

| Parameter name & units | Default value | Notes |
|---|---|---|
| Qdesign, cfm | | |
| Kf | | |
| Kidle | 0.2 | |
| kFilterMissing | 1.1 | |
| kFilterClogged | 1.1 | |
| Patm, "Hg | 29.92 | Calculated for jobs with elevation above 1000 ft. |
| dTcook, ° F. | 10 | |
| dTspace, ° F. | 10 | |
| Tmax, ° F. | 110 | |
| Tfire, ° F. | 400 | Set to be at least 10° F. below fuse ling temperature |
| TimeCook, s | 420 | |
| TimeOR, s | 60 | |
| dTIRmax, ° F. | 5 | |

TABLE 6

List of process control set points

| Parameter name & units | Default value | Notes |
|---|---|---|
| IR1_Derivative_Max_SP | −1° C./sec | Derivative for Flare-up Set Point |
| IR1_Derivative_Min_SP | 300 sec | Derivative for IR Index Drop Set Point |
| IR1_Drop_SP1 | 1° C. | IR Index Drop Set Point |
| IR1_Filter_Time | 10 sec | IR Signal Filter Time Set Point |
| IR1_Jump_SP | 1° C. | IR Signal Jump Set Point (for flare-up) |
| IR1_Start_SP | 30° C. | IR Signal Start Cooking Equipment Set Point |
| IR2_Cooking_Timer1 | 420 sec. | Cooking Timer Set Point for IR1 Field of View |
| IR2_Derivative_Max_SP | 1° C./sec | Derivative for Flare-up Set Point |
| IR2_Derivative_Min_SP | −1° C./sec | Derivative for IR Index Drop Set Point |
| IR2_Drop_SP1 | 1° C. | IR Index Drop Set Point |
| IR2_Filter_Time | 10 sec | IR Signal Filter Time Set Point |
| IR2_Jump_SP | 1° C. | IR Signal Jump Set Point (for flare-up) |
| PID_Cal_K | 0.5%/CFM | PID Proportional Coefficient in Calibration Mode |
| PID_Cal_T | 100 sec | PID Integral Coefficient in Calibration Mode |
| PID_K | 0.5%/CFM | PID Proportional Coefficient in Cooking Mode |
| PID_T | 100 sec | PID Integral Coefficient in Cooking Mode |

TABLE 7

List of set points acquired during calibration

| Parameter name & units | Notes |
|---|---|
| VFDdesign, 0 to 1 | One for system |
| PstDesign, inches WC | One for system |
| BDPdesign$_i$, 0 to 1 | For each hood |

TABLE 8

List of process variables

| Parameter name & units | Notes |
|---|---|
| Q$_i$, cfm | For each hood |
| Qtot, cfm | See EquationA1.1 for calculating airflow |
| BDP$_i$, 0 to 1 | For each hood (one balancing damper per hood) |
| kAirflowDesign | One for system. See Error! Reference source not found. |
| IRT$_{i,n}$, ° F. | For each sensor in the hood |
| Tex$_i$, ° F. | For each hood |
| Tspace, ° F. | One for the whole space |
| VFD, 0 to 1 | One for system |

In various embodiments, the control module processor 304 can be configured to use the following equation to calculate the exhaust air flow (Q) at exhaust temperature Tex:

$$Q = K_f \cdot \sqrt{dp \cdot \frac{Dens_{std}}{Dens_{exh}}} \qquad \text{Eq. 1}$$

Where:
K$_f$ is the hood coefficient.
dp is the static pressure measured at the hood TAB port, in inches WC.
Dens$_{exh}$ is the density of the exhaust air in lb. mass per cubic feet.
Dens$_{std}$ is the standard density of air (=0.07487 lb/ft$^3$ at 70° F. and atm. pressure 29.921 inches of mercury).

$$Dens_{exh} = \frac{1.325 \, Patm}{459.4 + Tex} [\text{lb/ft}^3] \qquad \text{Eq. 2}$$

Where:
Tex—exhaust air temperature, in ° F.
Patm—atmospheric pressure, inches of Mercury.

$$Patm = 29.92(1 - 0.0000068753 \cdot h)^{8.2559} \qquad \text{Eq. 3}$$

Where:
h—elevation above seal level, ft
When reporting kAirflowDesign, mass flow of exhaust air thru all the hoods in the kitchen equipped with the DCV system Mtot [lb/ft$^3$] needs to be calculated and divided by total design mass airflow Mtot_design [lb/ft$^3$] for these hoods.

$$kAirflowDesign = \frac{Mtot}{Mtot_{design}} \qquad \text{Eq. 4}$$

Where Mtot and Mtot_design are calculated per Eq. 4 Dens$_{exh\_i}$ is calculated per eq. Eq. 2 using actual and design temperatures of exhaust air.

$$M = \sum_{i=1}^{n} Q_i \cdot Dens_{exh_i} \qquad \text{Eq. 5}$$

Figure 5:
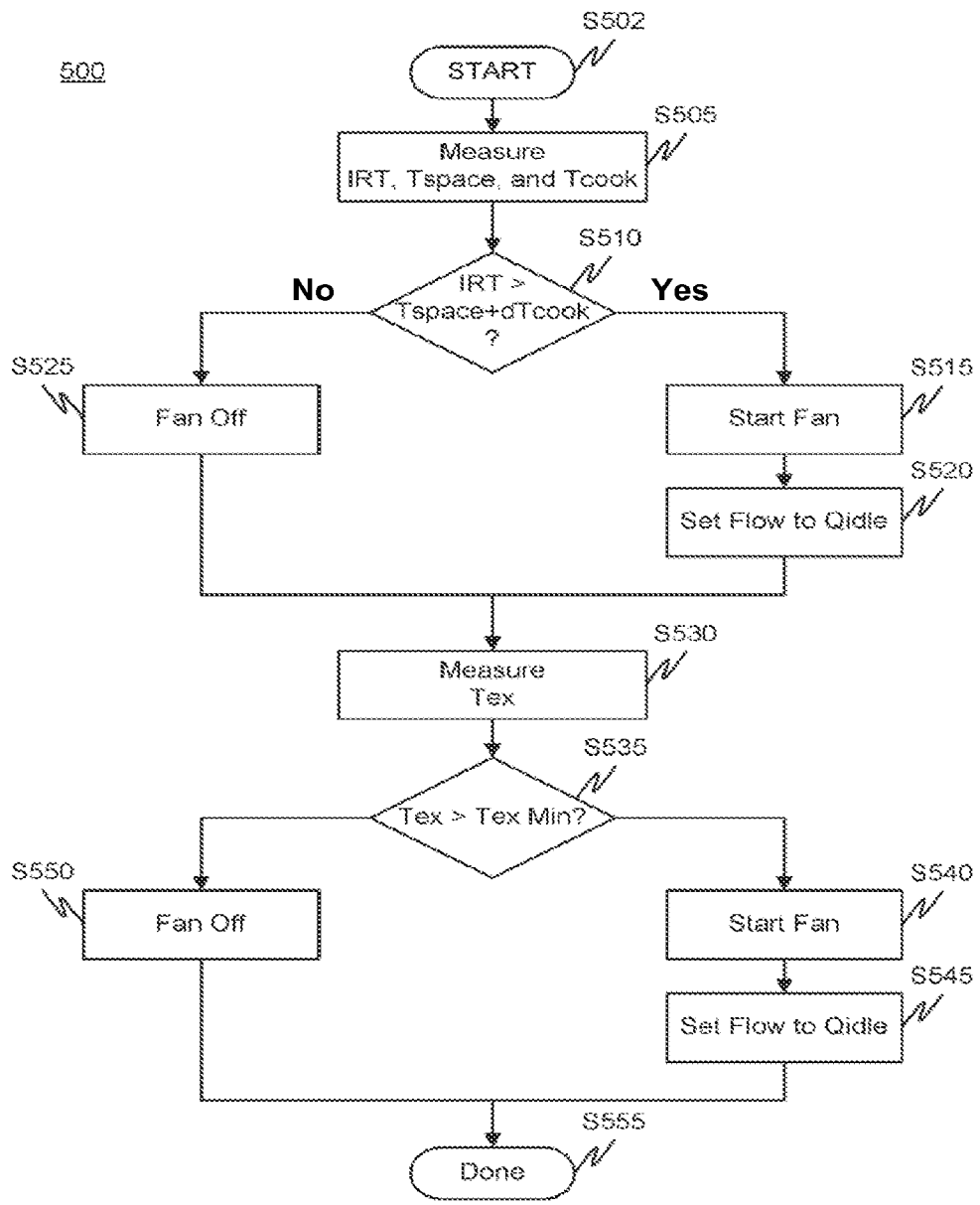
FIG. 5 is a flow diagram of an exemplary start-up routine of at least one embodiment with or without automatic dampers.

FIG. 5 illustrates a flow diagram for a start-up routine 500 which can be performed by the control module 302 of an embodiment having single or multiple hoods connected to a single exhaust fan, and without motorized balancing dampers at the hood level. The start-up routine 500 starts at S502 and can include one of the following three options to start the exhaust fan 316:

1) Automatically, when any of the Appliances Under the Hood is Switched on (500):

In block S505, the infrared sensor 120 can measure the radiant temperature (IRT) of the cooking surface of any of the at least one cooking appliance 115, the ambient air temperature sensor 160 can measure the temperature of the space around the cooking appliance (Tspace), and another temperature sensor can measure the cooking temperature (Tcook). If the processor 304 in the control module 302 determines that the radiant temperature (IRT) exceeds the minimum temperature reading (IRTmin) (IRTmin=Tspace+ dTcook) (block S510), the control module 302 can start the fan (block S515) and set the exhaust air flow (Q) to (Qidle) (block S520). If the processor 304 determines that the radiant temperature (IRT) does not exceed the minimum temperature (IRTmin) (block S510), then the control module keeps the fan turned off (block S525).

The control module 302 can analyze a second reading as well before the system operation is started: At block S530, the exhaust temperature (Tex) can be measured with an exhaust temperature sensor 125. If the exhaust temperature exceeds a minimum preset exhaust temperature (Tex min) (block S535), the control module 302 can start the fan and set the exhaust air flow (Q) at (Qidle) (block S545). If the exhaust temperature (Tex) does not exceed the minimum exhaust temperature (Tex min), the control module 302 can turn the fan off (block S550). The start-up routine can be terminated after these steps are followed (block S550).

2) On Schedule:

Pre-programmable (e.g., for a week) schedule to switch on and switch off exhaust hoods. When on schedule hood exhaust airflow (Q) is set to (Qidle).

3) Manually, with the Override Button on the Hood:

In various embodiments actuating of an override button on the hood can set hood exhaust airflow (Q) to (Qdesign) for the preset period of time (TimeOR).

The flow diagram for the start-up routine implemented by the control module 302 of a second embodiment of a system 200 with multiple hoods connected to a single exhaust fan, and with motorized balancing dampers at the hood level, follows substantially the same steps as illustrated in FIG. 5, except that at each step the balancing dampers BD can be kept open so that together with the exhaust fan, the appropriate exhaust air flow (Q) can be maintained.

Figure 6:
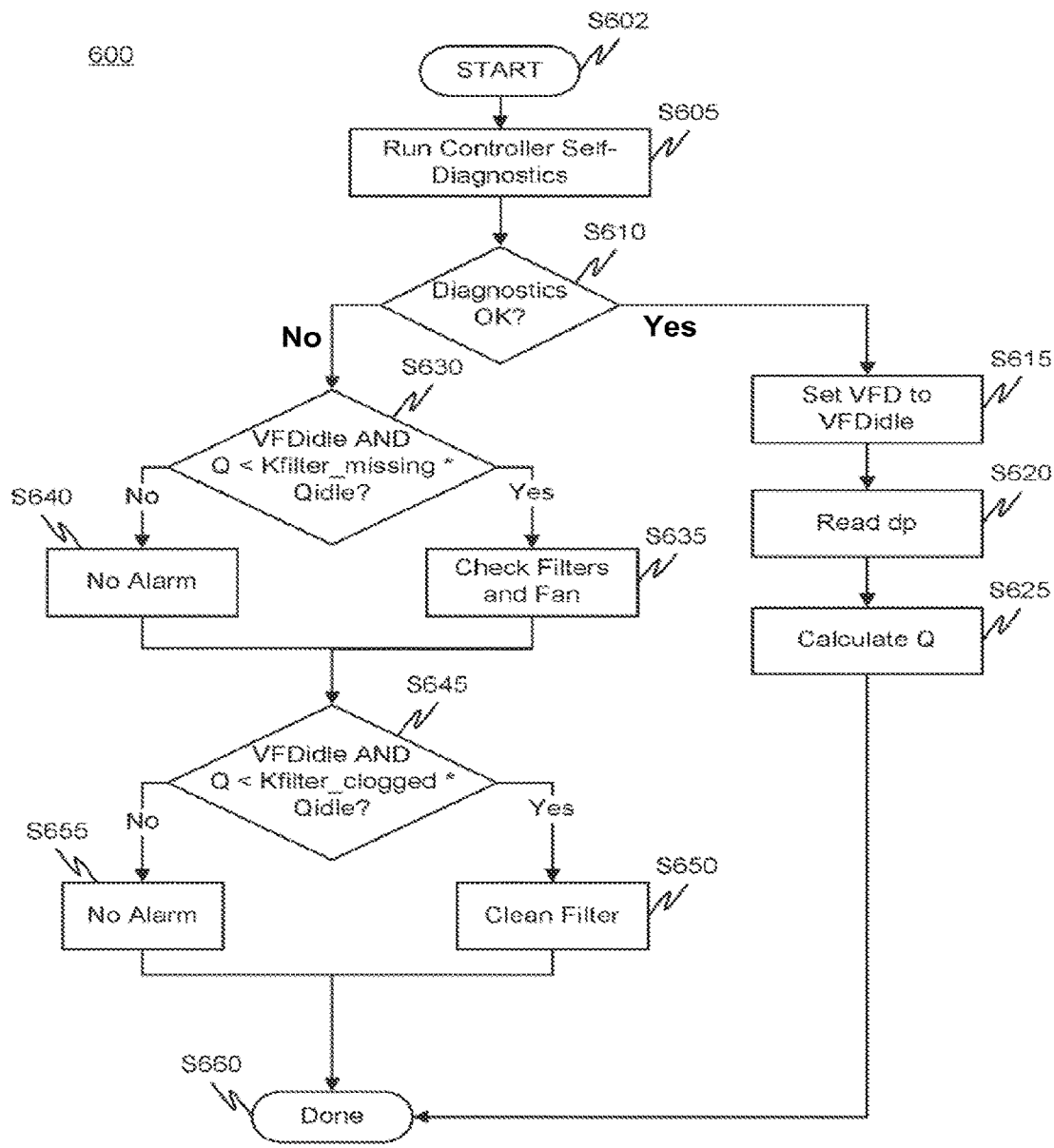
FIG. 6 is a flow diagram of a check routine of at least one embodiment with a single hood and no dampers.

Referring to FIG. 6, a flow diagram is provided showing a routine 600 which can be performed by the control module 302 to check the system 100 before the start of the flow control operation. The routine 600 can start at S602 and continue to a control module self-diagnostics process (block S605). If the self-diagnostic process is OK (block S610) the control module 302 can set the variable frequency drive (VFD) which controls the exhaust fan speed to a preset frequency (VFDidle) (block S615). Then the static pressure can be measured by a pressure transducer positioned at the hood TAB port (block S620) and the exhaust flow can be set to (Q) calculated using the formula of Eq. 1 (block S625). If the self-diagnostics process fails, the control module 302 can verify whether the (VFD) is the preset (VFDidle) and whether the exhaust air flow (Q) is less or exceeds (Qidle) by a threshold airflow coefficient (blocks S630, S645). Based on the exhaust airflow reading, the control module 302 generates and outputs appropriate error codes, which can be shown or displayed on an LCD display or other appropriate indicator 317 attached to the exhaust hood or coupled to the control module 302.

If the exhaust flow (Q) is less than (Qidle) by a filter missing coefficient (Kfilter missing) (block S630) then the error code "check filters and fan" can be generated (block S635). If, on the other hand, the exhaust flow (Q) exceeds (Qidle) by a clogged filter coefficient (Kfilter clogged) (block S645) then a "clean filter" alarm can be generated (block S650). If the exhaust flow (Q) is in fact the same as (Qidle) then no alarm is generated (blocks S650, S655), and the routine ends (S660).

Figure 7:
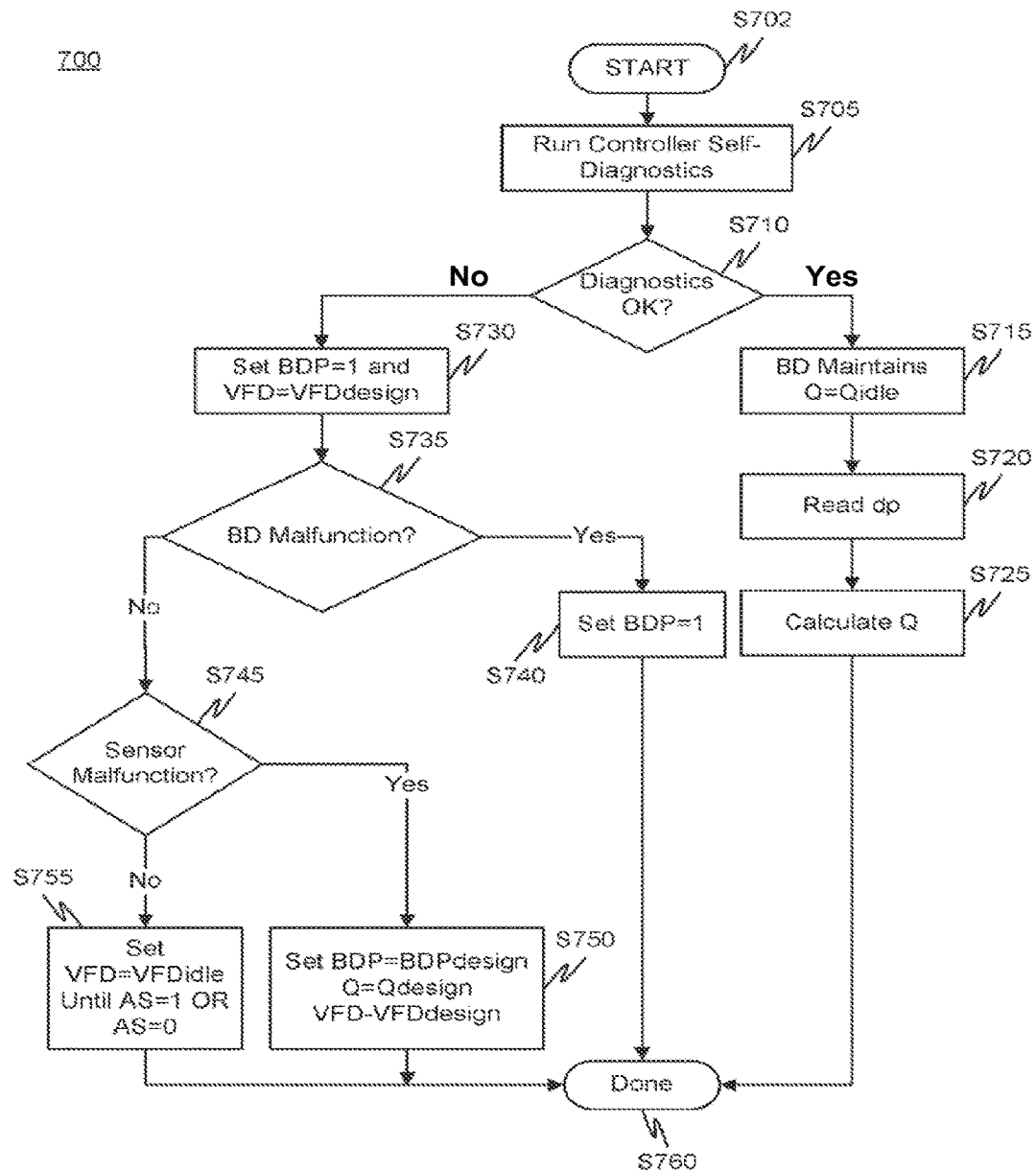
FIG. 7 is a flow diagram of a checking routine of at least one embodiment with multiple hoods, one fan and motorized dampers.

Referring to FIG. 7, a flow diagram is provided showing another routine 700 which can be performed by the control module 302 to check the system 200. The routine 700 can start at S702 and continue to a control module 302 self-diagnostics process (block S705). If a result of the self-diagnostic process is OK (block S710), the control module 302 can maintain the exhaust air flow (Q) at (Qidle) by maintaining the balancing dampers in their original or current position (block S715). Then, the static pressure (dp) is measured by the pressure transducer positioned at the hood TAB port (block S720), and the exhaust flow is set to (Q) calculated using Eq. 1 (block S725). If the self-diagnostics process fails, the control module can set the balancing dampers (BD) at open position and (VFD) at (VFDdesign) (block S730).

The control module 302 can then check whether the balancing dampers are malfunctioning (block S735). If there is a malfunctioning balancing damper, the control module 302 can open the balancing dampers (block S740). If there is no malfunctioning balancing damper, then the control module 302 can check whether there is a malfunctioning sensor in the system (block S745). If there is a malfunctioning sensor, the control module 302 can set the balancing dampers at (BDPdesign), the (VFD) at (VFDdesign) and the exhaust airflow to (Qdesign) (block S750). Otherwise, the control module 302 can set (VFD) to (VFDidle) until the cooking appliance is turned off (block S755). This step terminates the routine (block S760).

Figure 8:
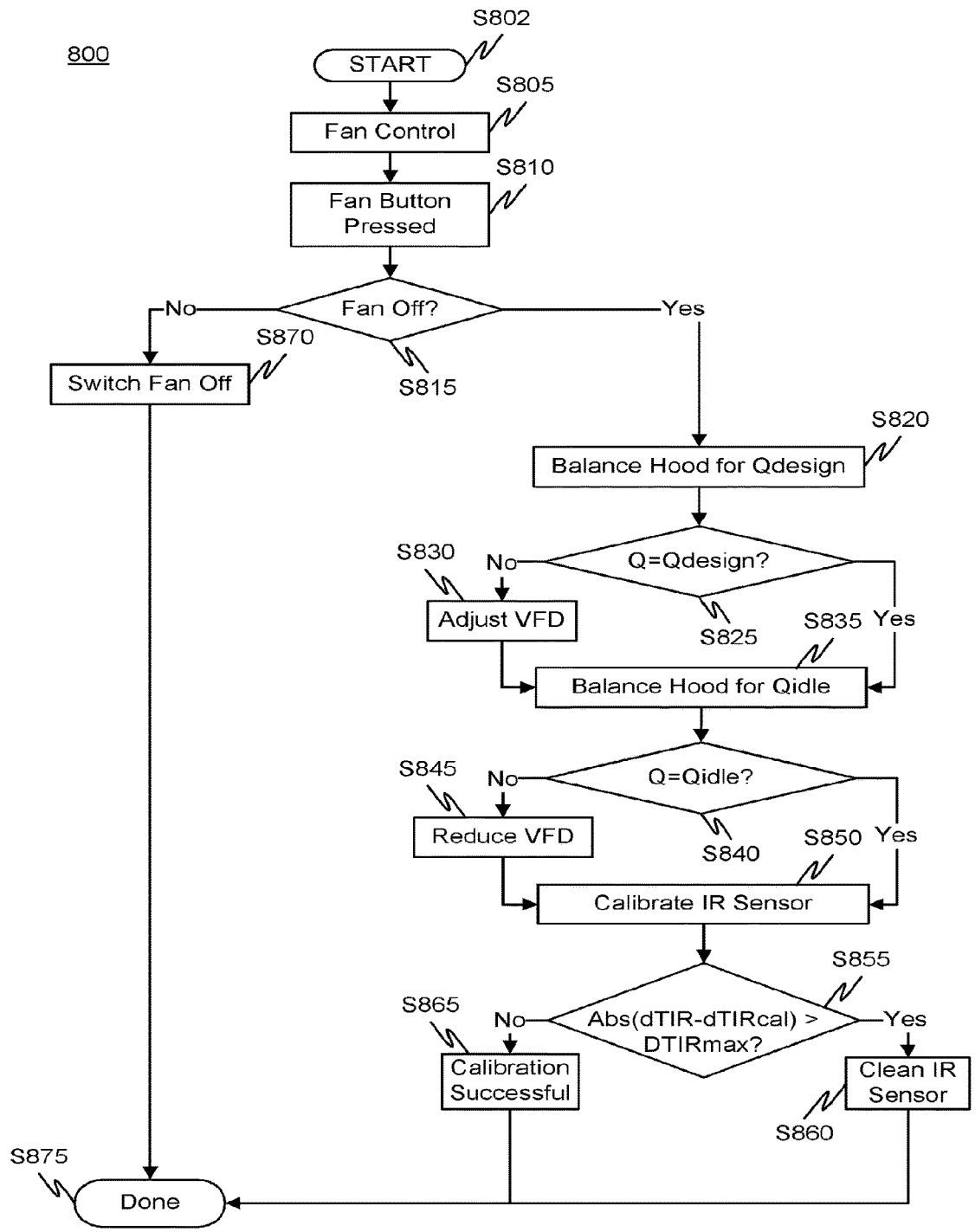
FIG. 8 is a flow diagram of a calibration routine for at least one embodiment with a single hood, single fan and no motorized dampers.

In various embodiments the hood 105 is automatically calibrated to design airflow (Qdesign). The calibration procedure routine 800 is illustrated in FIG. 8. The routine starts at S802 and can be activated with all ventilation systems functioning and cooking appliances in the off state (blocks S805, S810). The calibration routine 800 can commence with the fan turned off (blocks S810, S870). If the fan is turned off, the hood can be balanced to the design airflow (Qdesign) (block S830). If the hood is not balanced (block S825), the control module 302 can adjust VFD (block S830) until the exhaust flow reaches (Qdesign) (block S835). The routine 800 then waits until the system is stabilized. Then, the hood 105 can be balanced for (Qidle) by reducing (VFD) speed (blocks S840, S845). The routine 800 once again waits until the system 100 is stabilized.

The next step is to calibrate the sensors (block S850). The calibration of the sensors can be done during a first-time calibration mode, and is performed for cold cooking appliances and when there are no people present under the hood. The radiant temperature (IRT) can be measured and compared to a thermostat reading (Tspace), and the difference can be stored in the control module 302 memory 306 for each of the sensors (block S855). During subsequent calibration procedures or when the exhaust system is off, the change in the radiant temperature is measured again and is compared to the calibrated value stored in the memory 306 (block S855). If the reading is higher than a maximum allowed difference, a warning is generated in the control module 302 to clean the sensors (block S860). Otherwise the sensors are considered calibrated (block S865) and the routine 800 is terminated (block S875).

Figure 9:
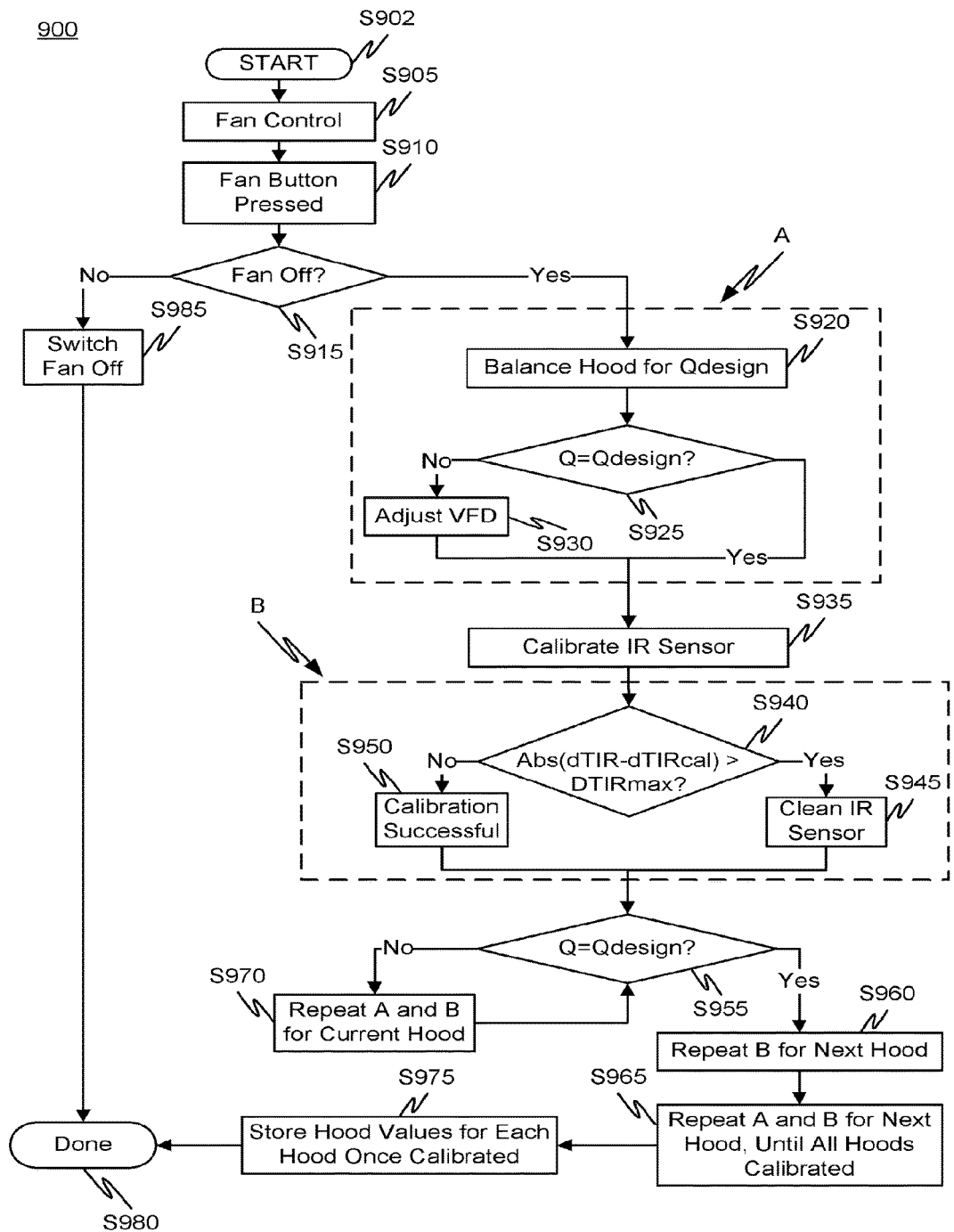
FIG. 9 is a flow diagram of a calibration routine for at least one embodiment with multiple hoods, one fan and no motorized dampers.

FIG. 9 illustrates the calibration routine 900 for a system with multiple hoods, one fan and no motorized balancing dampers. The routine 900 can follow substantially the same steps as for a single hood, single fan, and no motorized damper system shown above, except that for routine 900 every hood is calibrated. The routine 900 starts with Hood 1 and follows hood balancing steps as shown above (blocks S905-S930, and S985), as well as sensor calibration steps as shown above (blocks S935-S950).

Figure 10:
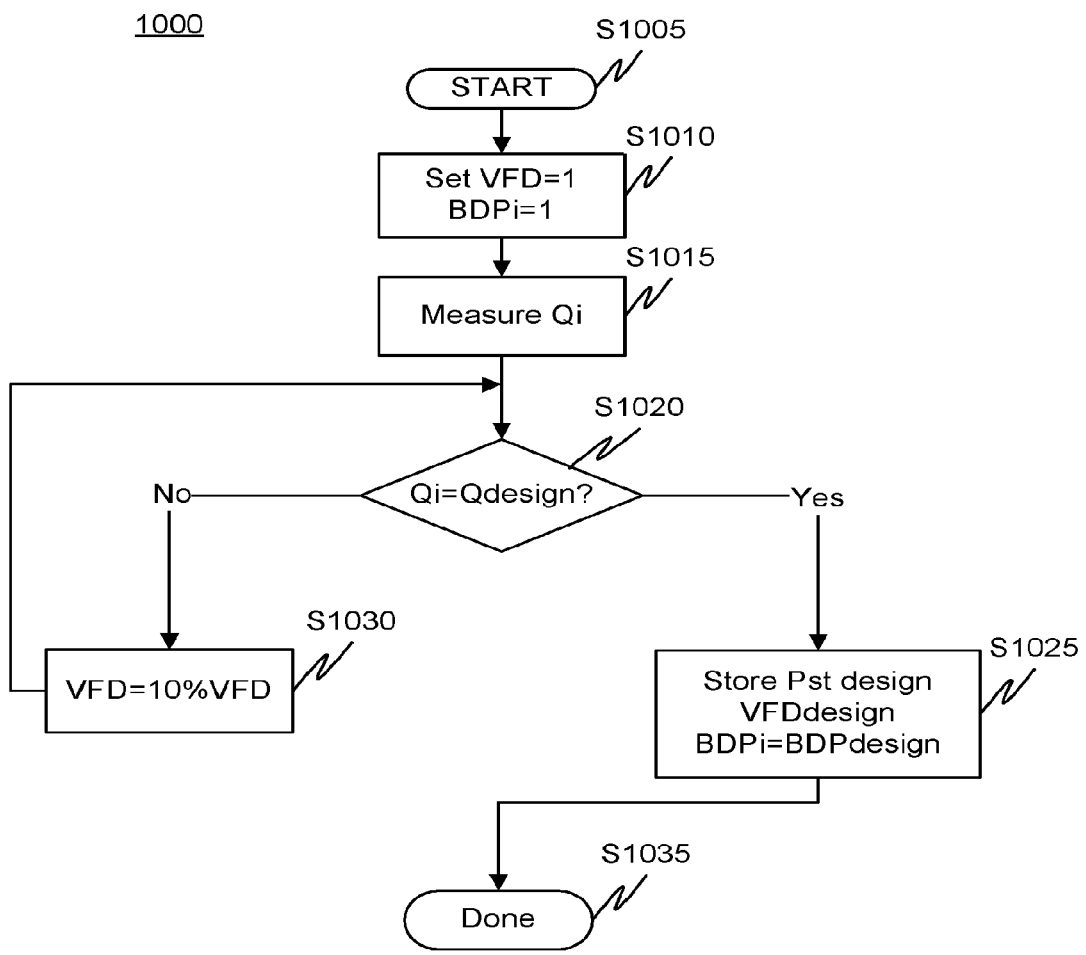
FIG. 10 is a flow diagram of a calibration routine for at least one embodiment with one or multiple hoods, one fan, and motorized dampers.

Once the first hood is calibrated, the airflow for the next hood is verified (block S955). If the airflow is at set point (Qdesign), the sensor calibration is repeated for the second (and any subsequent) hood (blocks S960, S965). If the airflow is not at the set point (Qdesign), the airflow and the sensor calibration can be repeated (S970) for the current hood. The routine 900 can be followed until all hoods in the system are calibrated (S965). The new design airflows for all hoods can be stored in the memory 306 (block S975) and control ends at S980. FIG. 10 illustrates the automatic calibration routine 1000 which may be performed by the second embodiment 200. During the calibration routine 1000 all hoods are calibrated to design airflow (Qdesign) at minimum static pressure. The calibration procedure 1000 can be activated during the time the cooking equipment is not planned to be used with all hood filters in place, and repeated regularly (once a week for example). The routine 1000 can be activated at block S1005. The exhaust fan can be set at maximum speed VFD=1 (VFD=1—full speed; VFD=0—fan is off) and all balancing dampers are fully open (BDP=1—fully open; BDP=0—fully closed) (block S1010). The exhaust airflow can be measured for each hood using the TAB port pressure transducer (PT) (block S1015). In various embodiments each hood can be balanced to achieve the design airflow (Qdesign) using the balancing dampers. At this point, each BDP can be less than 1 (less than fully open). There may also be a waiting period in which the system stabilizes.

If the exhaust airflow is not at (Qdesign), the VFD setting is reduced until one of the balancing dampers is fully open (block S1030). In at least one embodiment this procedure can be done in steps by gradually reducing the VFD setting by 10% at each iteration until one of the dampers is fully open and the air flow is (Q)=(Qdesign) (blocks S1020, S1030). If, on the other hand, at block S1020, the airflow is Q=(Qdesign), the pressure transducer setting in the main exhaust duct (Pstdesign), the fan speed VFDdesign, and the balancing damper position BDPdesign settings can be stored (block S1025). At this point the calibration is done (block S1035).

Figure 11:
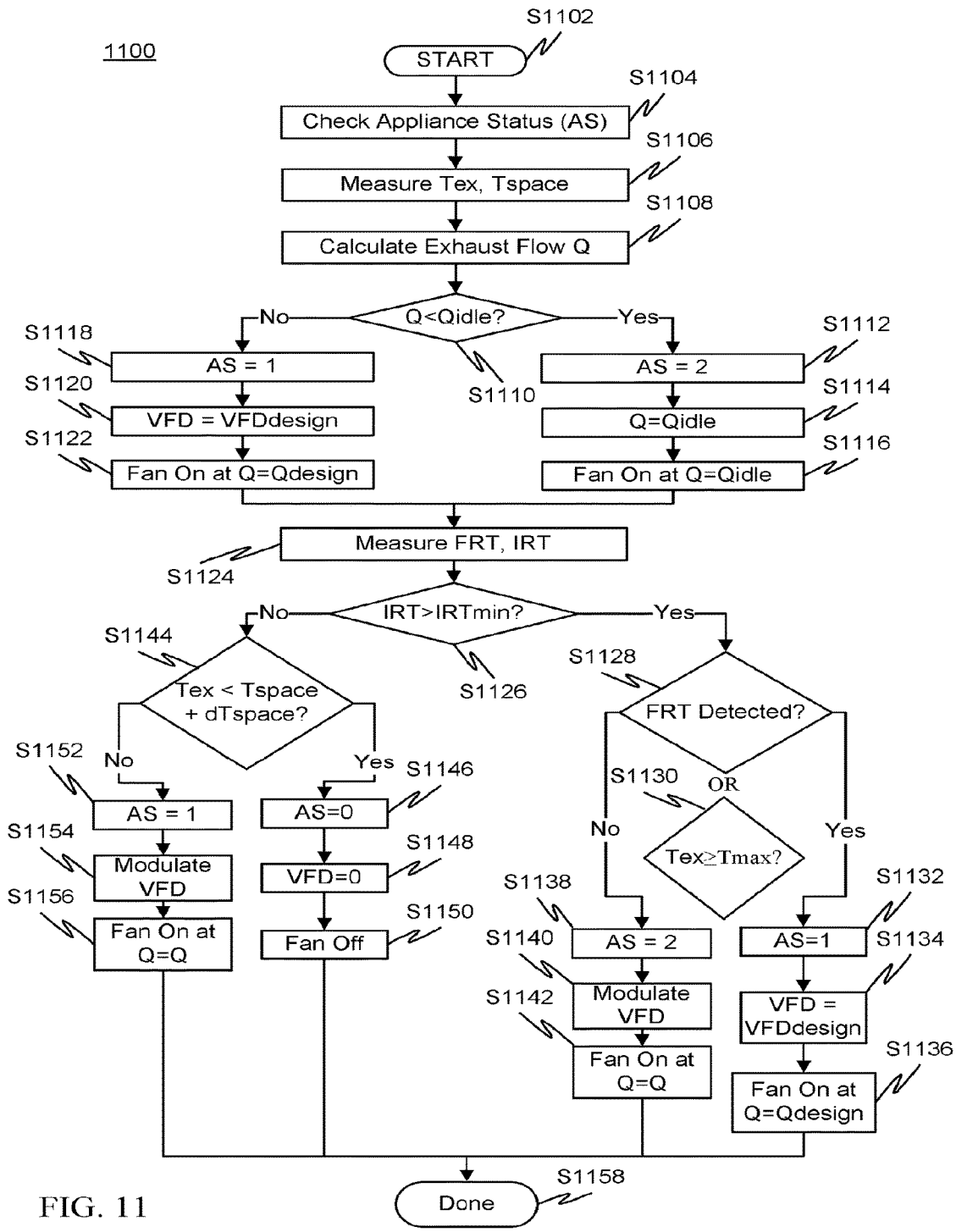
FIG. 11 is a flow diagram of an operation routine for at least one embodiment without motorized balancing dampers.

FIG. 11 is a flow chart of a method 1100 to control the exhaust airflow as implemented in the various embodiments in accordance with the system 100. As shown in FIG. 11, the individual hood exhaust airflow (Q) can be controlled based on the appliance status (AS) or state, which can be, for example, AS=1, which indicates that the corresponding appliance is in a cooking state, AS=2, which indicates that the corresponding appliance is in an idle state, and AS=0, which indicates that the corresponding cooking appliance is turned off. The exhaust temperature sensors 125 and the radiant IR sensors 120 can be used to detect the appliance status by applying their respective readings to the processor 175. Based on the reading provided by the sensors, the control module 302 can change the exhaust airflow (Q) in the system 100 to correspond to a predetermined airflow (Qdesign), a measured airflow (Q) (see below), and a predetermined (Qidle) airflow. When the detected cooking state is AS=1, the control module 302 can adjust the airflow (Q) to correspond to the predetermined (Qdesign) airflow. When the cooking state is AS=2, the control module 302 can adjust the airflow (Q) calculated according to the following equation:

$$Q = Qdesign\left(\frac{Tex - Tspace + dTspace}{Tmax - Tspace + dTspace}\right) \quad \text{Eq. 6}$$

Furthermore, when the detected cooking state is AS=0, the control module 302 can adjust the airflow (Q) to be Q=0.

In particular, referring again to FIG. 11, control begins at S1102 and continues to block S1104, in which the appliance status can be determined based on the input received from the exhaust temperature sensors 125 and the IR temperature sensors 120. The exhaust temperature (Tex) and the ambient space temperature (Tspace) values can be read and stored in the memory 306 (block S1106) in order to calculate the exhaust airflow (Q) in the system (block S1108). The exhaust airflow (Q) can be calculated, for example, using equation Eq. 6. If the calculated exhaust airflow (Q) is less than the predetermined (Qidle) (block S1110) the cooking state can be determined to be AS=2 (block S1112) and the exhaust airflow (Q) can be set to correspond to (Qidle) (block S1114). In this case, the fan 130 can be kept at a speed (VFD) that maintains (Q)=(Qidle) (block S1116). If at block S1110, it is determined that the airflow (Q) exceeds the preset (Qidle) value, the appliance status can be determined to be AS=1 (cooking state) (block S1118) and the control module 302 can set the fan speed (VFD) at (VFD)=(VFD-design) (block S1120) to maintain the airflow (Q) at (Q)=(Qdesign) (block S1122).

At block S1124, the mean radiant temperature (IRT) as well as the fluctuation (FRT) of the radiant temperature emanating from the appliance cooking surface can be measured using the IR detectors 120. If the processor 304 determines that the radiant temperature is increasing or decreasing faster than a pre-determined threshold, block 1128 and the cooking surface is hot (IRT>IRTmin) (block S1126), then the appliance status is reported as AS=1 (S1132) and the speed of fan 130 (VFD) can be set to (VFDdesign) (block S1134). When the exhaust hood 105 is equipped with multiple IR sensors 120, by default, if either one of the sensors indicates a fluctuation in the radiant temperature (block S1128), then cooking state (AS=1) is reported. When the cooking state is detected, hood exhaust airflow (Q) can be set to design airflow (Q=Qdesign) (S1136) for a preset cooking time (TimeCook) (7 minutes, for example). In at least one embodiment, this overrides control by exhaust temperature signal (Tex) (block S1130). Moreover, if the signal from IR sensors 120 indicates another temperature fluctuation within cooking time (TimeCook), the cooking timer is reset.

On the other hand, if the IR sensors 120 indicate no temperature fluctuations within preset cooking time (TimeCook), the appliance status is reported as idle AS=2 (S1138) and the fan 130 speed can be modulated (block S1140) to maintain exhaust airflow at (Q)=(Q) calculated according to Eq. 6 (block S1142). When all IR sensors 120 indicate (IRT<IRTmin) (block S1126) and (Tex<Tspace+dTspace) (block S1144), the appliance status is determined to be OFF (AS=0) (block 51146) and the exhaust fan 130 is turned off (block 51150) by setting VFD=0 (block S1148). Otherwise, the appliance status is determined to be cooking (AS=2) (block S1152) and the fan 130 speed (VFD) is modulated (block S1154) to keep the exhaust airflow (Q) at a level calculated according to equation Eq. 6 (described above) (block S1156). The operation 1100 may end at block 51158, with the control module 302 setting the airflow (Q) at the airflow level based on the determined appliance status (AS).

Figure 12A:
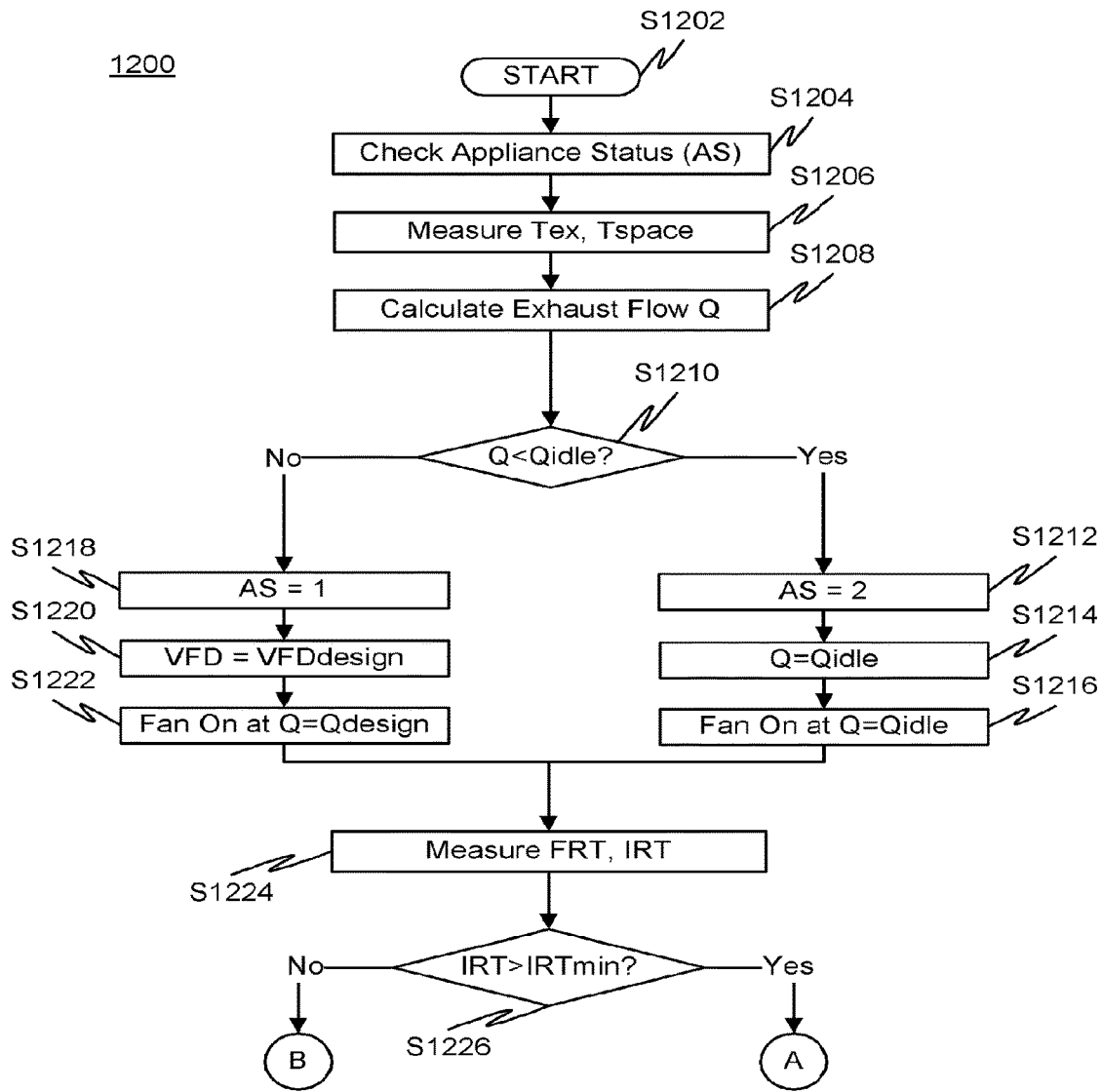
FIGS. 12A-12C are flow diagrams of an operation routine for at least one embodiment with motorized balancing dampers.
Figure 12B:
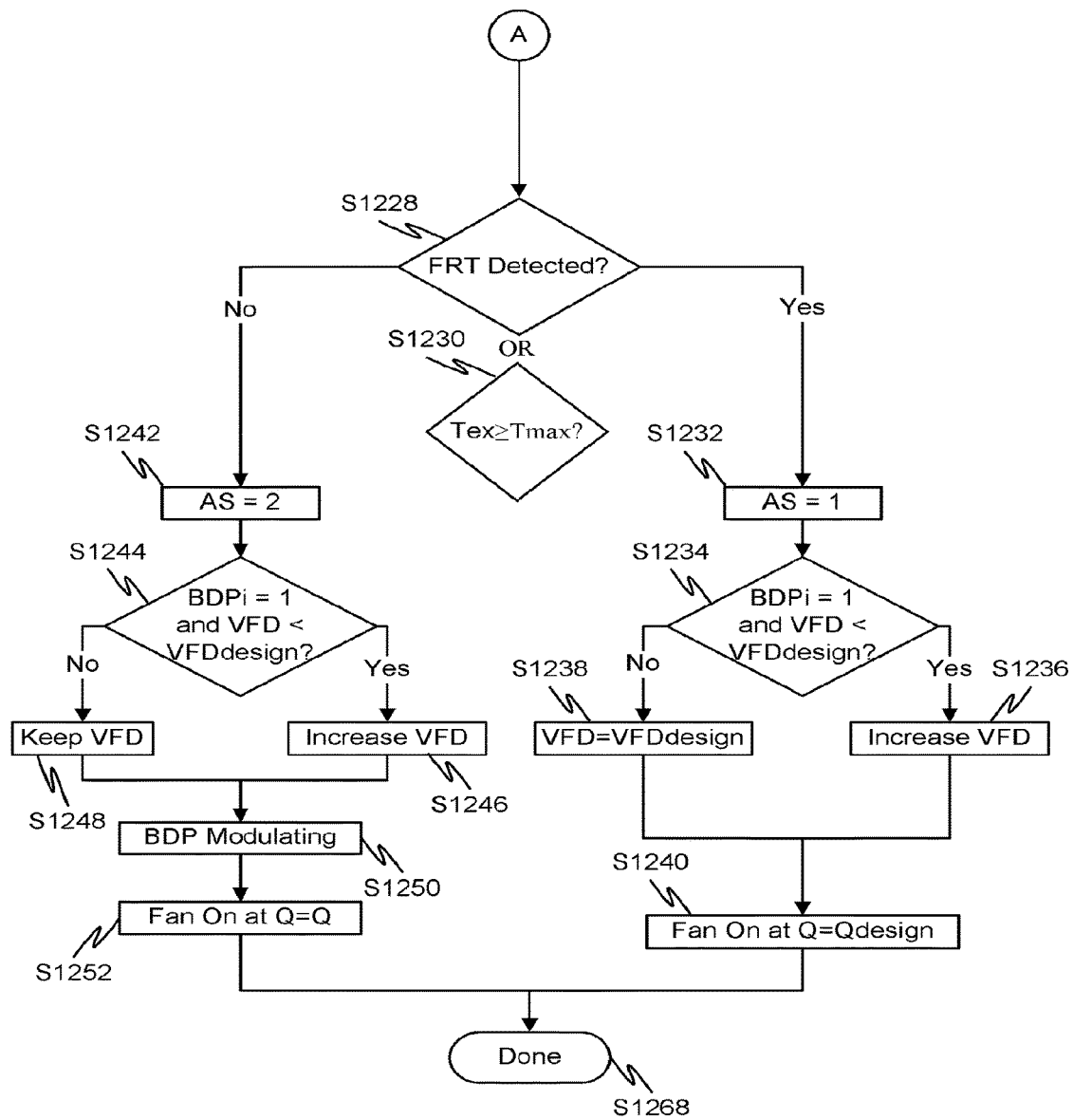
Figure 12C:
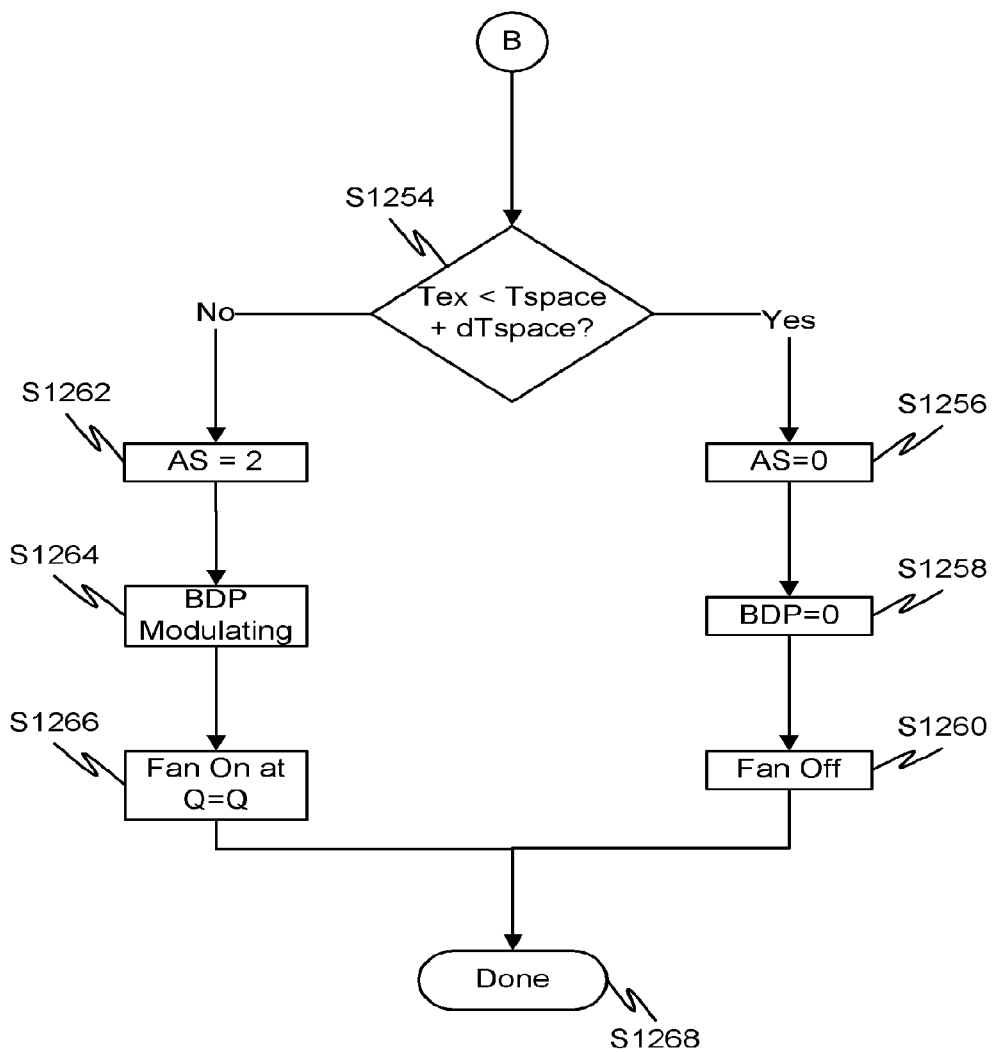

FIGS. 12A-12C illustrate an exemplary method 1200 to control the exhaust airflow in a system 200 with motorized balancing dampers at each exhaust hood 105. The method 1200 can follow substantially similar steps as the method 1100 described above, except that when fluctuation in the radiant temperature (FRT) is detected from the IR sensors 120 (block S1228), or when the exhaust temperature (Tex) exceeds a minimum value (Tmin) (block S1230), the appliance status is determined to be AS=1 (block 1232), and the control module 302 additionally checks whether the balancing dampers are in a fully open position (BDP)=1, as well as whether the fan 130 speed (VFD) is below a pre-determined design fan speed (block S1380). If the conditions above are true, the fan 130 speed (VFD) is increased (block 1236) until the exhaust flow Q reaches the design airflow (Qdesign) (block S1240). If the conditions above are not true, the fan 130 speed (VFD) is maintained at (VFDdesign) (block 51238) and the airflow (Q) is maintained at (Q)=(Qdesign) (block S1240).

On the other hand, if there is no radiant temperature fluctuation (block S1228) or the exhaust temperature (Tex) does not exceed a maximum temperature (Tmax) (block S1230), the appliance status is determined to be the idle state AS=2 (block S1242). Additionally, the control module 302 can check whether the balancing dampers are in a fully opened position (BDP)=1 and whether the fan 130 speed (VFD) is below the design fan speed (block S1244). If the answer is yes, the fan 130 speed (VFD) is increased (block S1246) and the balancing dampers are modulated (block S1250) to maintain the airflow (Q) at (Q)=(Q) (calculated according to equation Eq. 6) (block S1252).

In the case that in which the radiant temperature detected does not exceed the threshold (block S1226) and the exhaust temperature is (Tex<Tspace+dTspace) (block S1254), the appliance status is determined to be AS=0 (off) (block S1256), the balancing dampers are fully closed (BDP=0) (block 51258) and the fan 130 is turned off (S1260). The appliance status can be stored, on the other hand, if the exhaust temperature exceeds the ambient temperature, the appliance status is determined to be AS=2 (block S1262) and the balancing dampers are modulated (block S1264) to keep the fan 130 on to maintain the airflow of (Q)=(Q), which is calculated based on equation Eq. 6 (block S1266). The operation may then end and the exhaust airflow is set according to the determined appliance status (block S1268).

Figure 13:
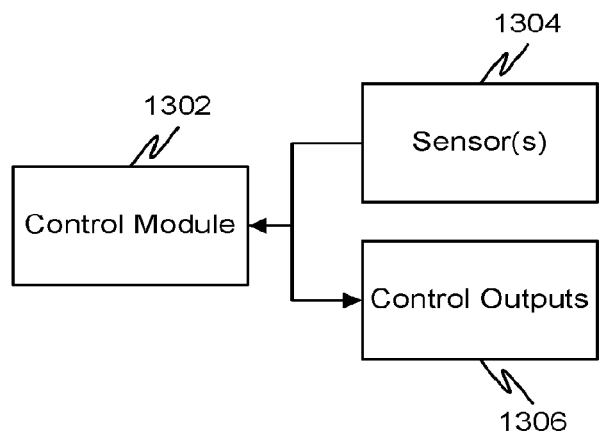
FIG. 13 is a block diagram of an exemplary exhaust flow control system in accordance with the present disclosure.
Figure 13:
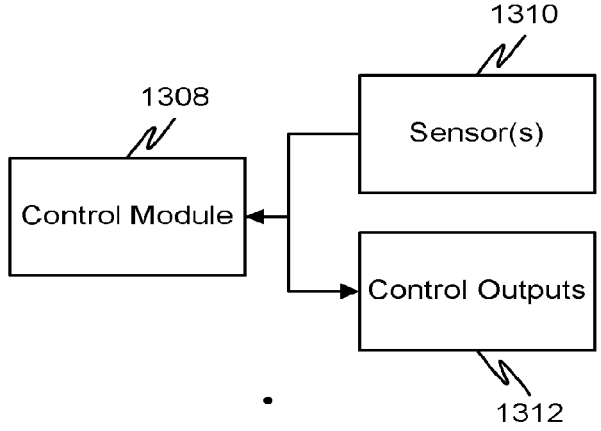
Figure 13:
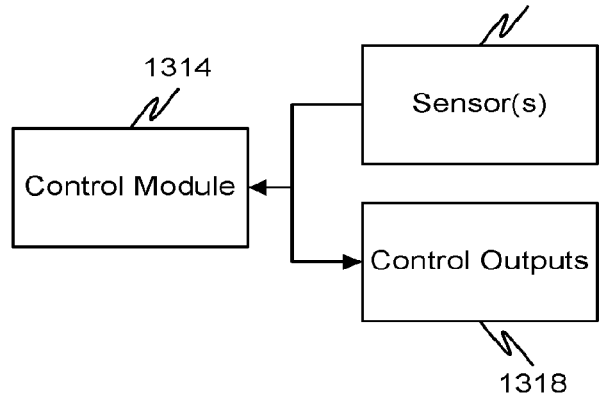

FIG. 13 is a block diagram of an exemplary exhaust flow control system in accordance with the present disclosure. In particular, a system 1300 includes a plurality of control modules (1302, 1308, and 1314) each coupled to respective ones of sensors (1304, 1310 and 1316, respectively), as described above (e.g., temperature, pressure, etc.), and outputs (1306, 1312, and 1318, respectively), as described above (e.g., motor control and damper control signals). The control modules can control their respective exhaust flow systems independently or in conjunction with each other. Further, the control modules can be in communication with each other.

Figure 14:
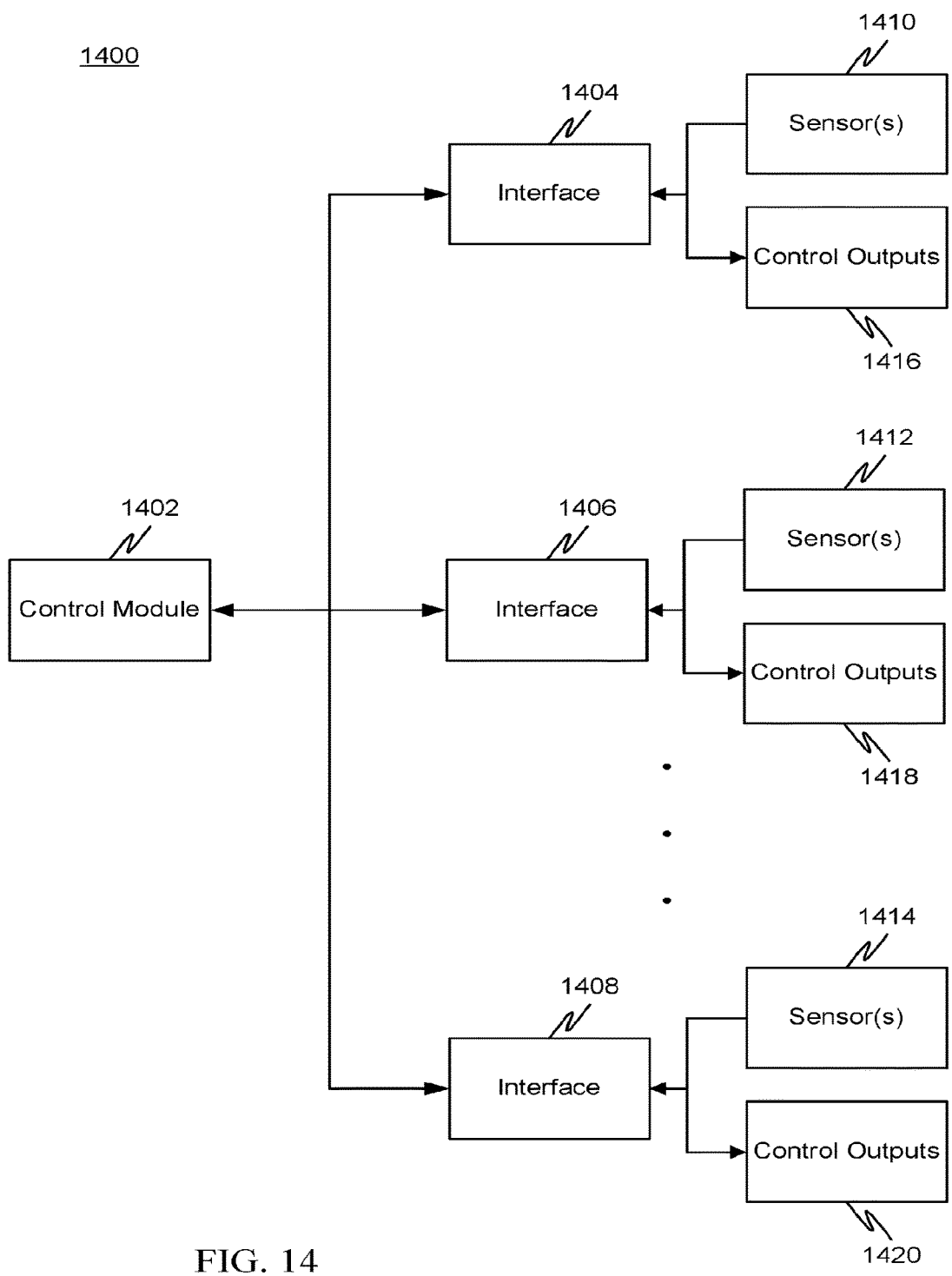
FIG. 14 is a block diagram of an exemplary exhaust flow control system in accordance with the present disclosure.

FIG. 14 is a block diagram of an exemplary exhaust flow control system in accordance with the present disclosure. In particular, a system 1400 includes a single control module 1402 coupled to a plurality of interfaces 1404-1408, which are each in turn coupled to respective sensors (1410-1414) and control outputs (1416-1420). The control module 1402 can monitor and control the exhaust flow rate for multiple hoods adjacent to multiple appliances. Each appliance can be independently monitored and an appropriate exhaust flow rate can be set as described above. In the configuration shown in FIG. 14, it may be possible to update the software in the control module 1402 once and thereby effectively updated the exhaust flow control system for each of the hoods. Also, the single control module 1402 may reduce costs and simplify maintenance for the exhaust flow control systems and allow an existing system to be upgraded or retrofitted to include the exhaust flow control method described above.

Figure 15:
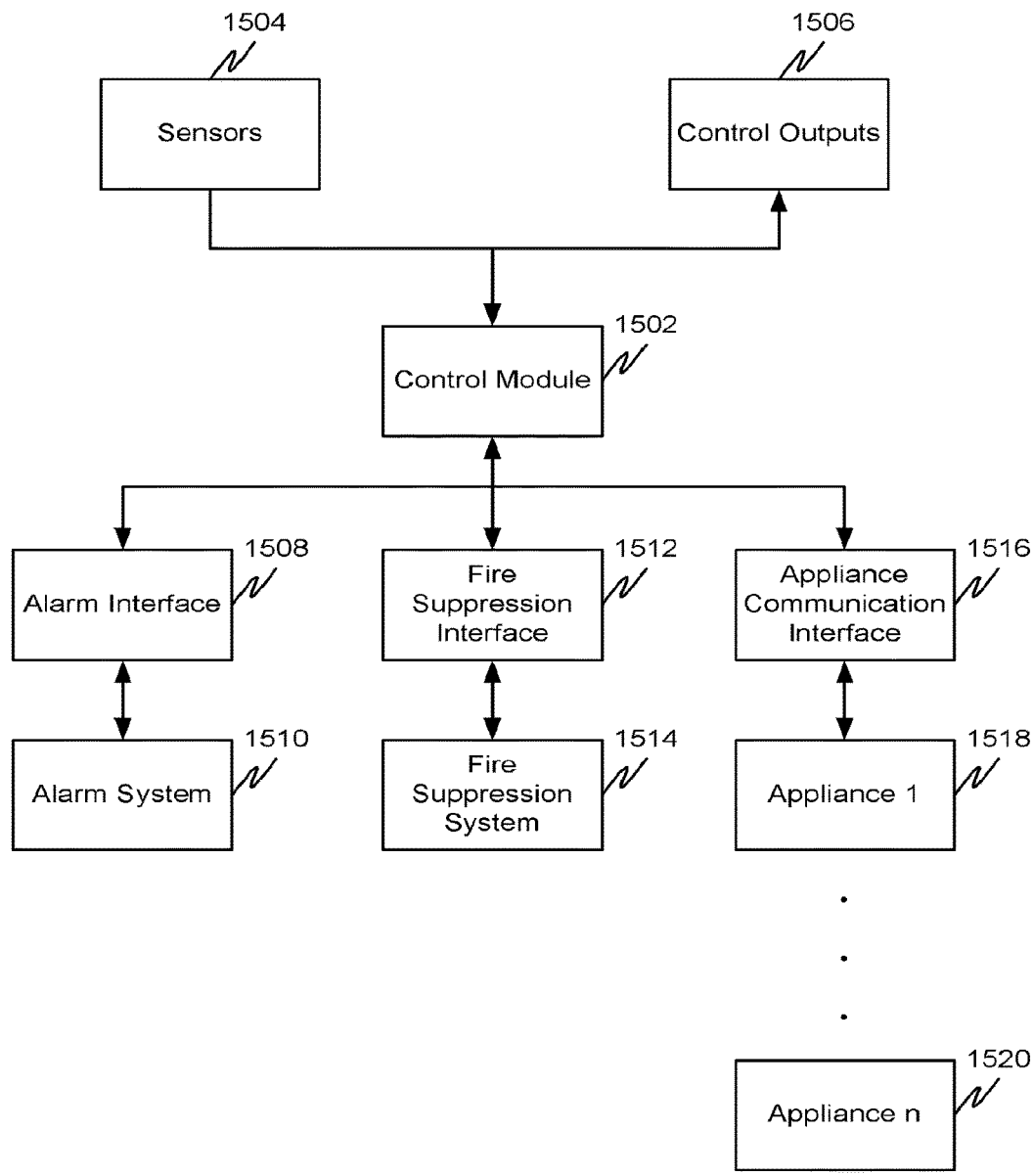
FIG. 15 is a block diagram of an exemplary exhaust flow control system in accordance with the present disclosure.

FIG. 15 is a block diagram of an exemplary exhaust flow control system in accordance with the present disclosure. In particular, a system 1500 includes a control module 1502 coupled to sensors 1504 and control outputs 1506. The control module 1502 is also coupled to an alarm interface 1508, a fire suppression interface 1512, and an appliance communication interface 1516. The alarm interface 1508 is coupled to an alarm system 1510. The fire suppression interface 1512 is coupled to a fire suppression system 1514. The appliance communication interface 1516 is coupled to one or more appliances 1518-1520.

In operation, the control module 1502 can communicate and exchange information with the alarm system 1510, fire suppression system 1514, and appliances 1518-1520 to better determine appliance states and a suitable exhaust flow rate. Also, the control module 1502 may provide information to the various systems (1510-1520) so that functions can be coordinated for a more effective operational environment. For example, the exhaust flow control module 1502, through its sensors 1504, may detect a fire or other dangerous condition and communicate this information to the alarm system 1510, the fire suppression system 1514, and the appliances 1518-1520 so that each device or system can take appropriate actions. Also, information from the appliances 1518-1520 can be used by the exhaust flow control system to more accurately determine appliance states and provide more accurate exhaust flow control.

Embodiments of a method, system and computer program product for controlling exhaust flow rate, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for controlling exhaust flow rate.

Furthermore, embodiments of the disclosed method, system, and computer program product for controlling exhaust flow rate may be readily implemented, fully or partially, in software using, for example, object or object-oriented software development environments that provide portable source code that can be used on a variety of computer platforms. Alternatively, embodiments of the disclosed method, system, and computer program product for controlling exhaust flow rate can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for controlling exhaust flow rate can be implemented in hardware and/or software using any known or later developed systems or structures, devices and/or software by those of ordinary skill in the applicable art from the functional description provided herein and with a general basic knowledge of the computer, exhaust flow, and/or cooking appliance arts.

Moreover, embodiments of the disclosed method, system, and computer program product for controlling exhaust flow rate can be implemented in software executed on a programmed general-purpose computer, a special purpose computer, a microprocessor, or the like. Also, the exhaust flow rate control method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for controlling exhaust flow rate into a software and/or hardware system, such as the hardware and software systems of exhaust vent hoods and/or appliances.

It is, therefore, apparent that there is provided in accordance with the present invention, a method, system, and computer program product for controlling exhaust flow rate. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

APPENDIX A

Abbreviations, Acronyms and Terms

AS—appliance status (e.g., AS=1—cooking, AS=2—idle, AS=0—off)
BD—balancing damper
BDP—balancing damper position (e.g., BDP=0—closed; BDP=1—open)
BDPdesign—balancing damper position corresponding to hood design airflow Qdesign. Achieved at VFD=VFDdesign
DCV—demand control ventilation
dTcook—pre-set temperature above Tspace when IR sensor interprets appliance being in idle condition, AS=2.
dTIR—temperature difference between IRT and Tspace (e.g., dTIR=IRT−Tspace).
dTIRcal—dTIR stored in the memory during first-time calibration procedure for each IR sensor.
dTIRmax—pre-set threshold value of absolute difference |dTIR−dTIRcal| that indicates that IR sensors need to be cleaned and re-calibrated
dTspace—pre-set temperature difference between Tex and Tspace when cooking appliance status is interpreted as "all appliances under the hood are off" (e.g., AS=0). Exemplary default value is 9° F.
FRT—fluctuation of radiant temperature of appliance cooking surface.
i—index, corresponding to hood number.
IRT—infra red sensor temperature reading, ° F.
IRTmin—minimum temperature reading, above which IR sensor detects appliance status as idle (e.g., AS=2). IRTmin=Tspace+dTcook.
kAirflowDesign—ratio of mass exhaust airflows. Total actual airflow to total design airflow for hoods equipped with DCV
Kf—hood coefficient, used to calculate hood exhaust airflow
kFilterClogged—threshold airflow coefficient to detect clogged filter, default value 1.1
kFilterMissing—threshold airflow coefficient to detect filter missing, default value 1.1
Kidle—idle setback coefficient, Kidle=1−Qidle/Qdesign
M—hood exhaust airflow, lb/h
Mdesign_tot—total design exhaust mass airflow for all hoods in the kitchen, equipped with the DCV system, lb/h
n—index, corresponding to IR sensor number in the hood.
Patm—atmospheric pressure, inches of Mercury.
PstDesign, inches WC—minimum static pressure in the main exhaust duct with all hoods
calibrated and running at design airflow Qdesign.
Q—hood exhaust airflow, cfm
Qdesign—hood design airflow, cfm
Qdesign_tot—total design exhaust airflow for all hoods in the kitchen, equipped with the DCV system, cfm
Qdesigni—new hood design airflow acquired during calibration procedure for multiple hoods connected to a single exhaust fan, cfm
Qidle—pre-set hood airflow in idle, when all appliances under the hood are in idle condition (by default Qidle=0.8—Qdesign)
Qtot—total exhaust airflow for all hoods in the kitchen, equipped with the DCV system, cfm
TAB—test and balancing port in the hood. Pressure transducer is connected to TAB port to measure pressure differential and calculate hood exhaust airflow.
Tex—hood exhaust temperature
Tex_min—minimum exhaust temperature, when appliance status is detected as idle, AS=2
Tfire—pre-set limit on exhaust temperature, close to fuse link temperature, ° F. When Tex≥Tfire—fire warning is generated.
TimeCook—pre-set cooking time, by default TimeCook=7 min
TimeOR—override time. Time period when hood airflow is maintained at design level Q=Qdesign when override button is pressed on the hood. By default TimeOR=1 min
Tmax—pre-set maximum hood exhaust temperature. At this temperature hood operates at design exhaust airflow.
Tspace—space temperature, ° F.
VFDdesign—VFD setting, corresponding Qdesign (VFD=1—fan at full speed; VFD=0—fan turned off)
VFDidle—VFD setting, corresponding Qidle

What is claimed is:

1. An exhaust ventilation system adapted for use with a cooking appliance that generates exhaust air, the exhaust ventilation system, comprising:
an exhaust hood positioned above the cooking appliance;
at least one temperature sensor attached to the exhaust hood and measuring temperature of exhaust air in a vicinity of the exhaust hood;
a radiant temperature sensor measuring radiant temperature of a surface of the cooking appliance;
a control module receiving a signal indicating the temperature of the exhaust air from the at least one temperature sensor and receiving a signal indicating the radiant temperature from the radiant temperature sensor,
the control module being coupled to a motor controller and configured to determine a status of the cooking appliance as at least one of
a cooking state,
an idle state, and
an off state based on
a mean of the radiant temperature, the temperature of the exhaust air, and fluctuation in the radiant temperature, the control module further configured to determine the status as the cooking state in response to the measured radiant temperature increasing or decreasing at a rate faster than a predetermined threshold, and the control module further configured to control an exhaust air flow rate based on the determined status of the cooking appliance;

an exhaust fan for removing exhaust air generated by the cooking appliance; and the motor controller for controlling the exhaust fan coupled to the control module and the exhaust fan, wherein the control module is configured to change the exhaust flow rate through the motor controller to design exhaust flow rate (Qdesign) when the cooking appliance is determined to be in the cooking state, to the idle exhaust flow rate (Qidle) when the appliance status is determined to be in the idle state, and to the off exhaust flow rate when the appliance is determined to be in the off state, and wherein the control module determines that the cooking appliance is in the cooking state when there is a fluctuation in the radiant temperature and the radiant temperature is greater than a predetermined minimum radiant temperature, the cooking appliance is in the idle state when there is no fluctuation in the radiant temperature, and the cooking appliance is in the off state when there is no fluctuation in the radiant temperature and the radiant temperature is less than a minimum predetermined radiant temperature.

2. The system of claim 1, wherein the at least one sensor for measuring the radiant temperature is an infrared sensor.

3. The system of claim 1, wherein the control module controls the exhaust air flow rate by controlling a speed of the exhaust fan.

4. The system of claim 1, further comprising at least one motorized balancing damper attached to the exhaust hood to control a volume of the exhaust air that enters the exhaust hood.

5. The system of claim 4, wherein the control module further controls the exhaust air flow rate by controlling a position of the at least one motorized balancing damper.

6. The system of claim 1, further including a temperature sensor for measuring an ambient temperature of the air in the vicinity of the ventilation system.

7. The system of claim 6, wherein the control module is further configured to determine a difference between the exhaust air temperature in the vicinity of the exhaust hood and the ambient temperature in the vicinity of the ventilation system.

8. The system of claim 7, wherein, based on the determined temperature difference, the control module determines that the cooking appliance is in the cooking state when the exhaust air temperature is greater than or equal to a maximum predetermined ambient temperature, the cooking appliance is in the idle state when the exhaust air temperature is less than the predetermined maximum ambient temperature, and the cooking appliance is in the off state when the exhaust air temperature is less than a predetermined ambient temperature.

9. The system of claim 1, wherein the system is calibrated before the control module controls the exhaust air flow.

10. The exhaust ventilation system according to claim 1, wherein the fan idle speed (Qidle) is determined according to the following equation:

$$Qidle = Qdesign\left(\frac{Tex - Tspace + dTspace}{Tmax - Tspace + dTspace}\right)$$

where Tex is the exhaust temperature, Tspace is the ambient temperature, dTspace is a predetermined temperature difference between the exhaust temperature and the ambient temperature, Tmax is a predefined maximum exhaust temperature, and Qdesign is a predefined design exhaust flow rate for the exhaust hood.

11. A control module for controlling an exhaust flow rate in an exhaust ventilating system comprising an exhaust hood positioned above a cooking appliance, the control module comprising:

a processor configured to receive a measured radiant temperature, and a measured exhaust air temperature as inputs from at least one radiant temperature sensor and at least one temperature sensor, respectively, the processor being configured to determine a status of the cooking appliance as at least one of a cooking state, an idle state, and an off state, based on a mean of the radiant temperature, the temperature of the exhaust air, and fluctuation in the radiant temperature, the control module further configured to determine the status as the cooking state in response to the measured radiant temperature increasing or decreasing at a rate faster than a predetermined threshold, the control module further configured to control an exhaust fan motor controller based on the determined status of the cooking appliance, the control module further configured to change the exhaust flow rate through the motor controller to design exhaust flow rate (Qdesign) when the cooking appliance is determined to be in the cooking state, to the idle exhaust flow rate (Qidle) when the appliance status is determined to be in the idle state, and to the off exhaust flow rate when the appliance is determined to be in the off state, and wherein the control module determines that the cooking appliance is in the cooking state when there is a fluctuation in the radiant temperature and the radiant temperature is greater than a predetermined minimum radiant temperature, the cooking appliance is in the idle state when there is no fluctuation in the radiant temperature, and the cooking appliance is in the off state when there is no fluctuation in the radiant temperature and the radiant temperature is less than a minimum predetermined radiant temperature.

12. The control module of claim 11, wherein the exhaust flow rate includes a design exhaust flow rate (Qdesign), an idle exhaust flow rate (Qidle), and an off exhaust flow rate.

13. The control module of claim 11, wherein the control module is configured to determine that the appliance is in the cooking state when the exhaust air temperature is greater than or equal to a maximum predetermined ambient temperature, that the appliance is in an idle state when the exhaust air temperature is less than the predetermined maximum ambient temperature, and that the appliance is in an off state when the exhaust air temperature is less than a predetermined ambient temperature.

14. The control module of claim 11, wherein the control module controls the exhaust air flow by controlling the exhaust fan motor controller which controls a speed of an exhaust fan attached to the exhaust hood.

15. The control module of claim 11, wherein the control module controls the exhaust air flow by controlling a position of at least one balancing damper attached to the exhaust hood.

16. The control module of claim 11, wherein the control module further calibrates the system before changing the exhaust flow rate.

17. The control module according to claim 11, wherein the fan idle speed (Qidle) is determined according to the following equation:

$$Qidle = Qdesign\left(\frac{Tex - Tspace + dTspace}{Tmax - Tspace + dTspace}\right)$$

where Tex is the exhaust temperature, Tspace is the ambient temperature, dTspace is a predetermined temperature difference between the exhaust temperature and the ambient temperature, Tmax is a predefined maximum exhaust temperature, and Qdesign is a predefined design exhaust flow rate for the exhaust hood.

18. An exhaust ventilation system adapted for use with a cooking appliance, the exhaust ventilation system comprising:
an exhaust hood;
a radiant temperature sensor measuring radiant temperature of a surface of the cooking appliance;
a control module coupled to a motor controller and configured to determine a status of the cooking appliance as at least one of a cooking state, an idle state, and an off state based on at least a measured radiant temperature;
an exhaust fan for removing exhaust air generated by the cooking appliance;
the motor controller coupled to the control module and the exhaust fan, wherein
the control module is further configured to control an exhaust air flow rate through the motor controller based on the determined status of the cooking appliance,
the control module is further configured to determine that the status of the cooking appliance is one of the cooking state and the idle state in response to the measured radiant temperature exceeding a predetermined threshold,
the control module is further configured to determine that the cooking appliance is in the cooking state when the radiant temperature increases faster than a predetermined threshold and when the radiant temperature decreases faster than the predetermined threshold, and
the control module is further configured to set the exhaust flow rate to a design exhaust flow rate (Qdesign) through the motor controller when the cooking appliance is determined to be in the cooking state.

19. The exhaust ventilation system according to claim 18, wherein the at least one radiant temperature sensor is an infra-red (IR) sensor.

20. The exhaust ventilation system according to claim 18, further comprising:
at least one temperature sensor attached to the exhaust hood and measuring temperature of exhaust air in the vicinity of the exhaust hood.

21. The exhaust ventilation system according to claim 20, wherein
the fan idle speed (Qidle) is determined according to the following equation:

$$Qidle = Qdesign\left(\frac{Tex - Tspace + dTspace}{Tmax - Tspace + dTspace}\right)$$

where Tex is the exhaust temperature, Tspace is the ambient temperature, dTspace is a predetermined temperature difference between the exhaust temperature and the ambient temperature, Tmax is a predefined maximum exhaust temperature, and Qdesign is a predefined design exhaust flow rate for the exhaust hood.

* * * * *